US010810734B2

(12) United States Patent
Salgian et al.

(10) Patent No.: US 10,810,734 B2
(45) Date of Patent: Oct. 20, 2020

(54) COMPUTER AIDED REBAR MEASUREMENT AND INSPECTION SYSTEM

(71) Applicants: SRI International, Menlo Park, CA (US); Obayashi Corporation, Tokyo (JP)

(72) Inventors: Garbis Salgian, Princeton Junction, NJ (US); Bogdan C. Matei, Princeton, NJ (US); Matthieu Henri Lecce, Philadelphia, PA (US); Abhinav Rajvanshi, Plainsboro, NJ (US); Supun Samarasekera, Skillman, NJ (US); Rakesh Kumar, West Windsor, NJ (US); Tamaki Horii, Osaka (JP); Yuichi Ikeda, Tokyo (JP); Hidefumi Takenaka, Toyonaka (JP)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/457,156

(22) Filed: Jun. 28, 2019

(65) Prior Publication Data

US 2020/0005447 A1  Jan. 2, 2020

Related U.S. Application Data

(60) Provisional application No. 62/692,891, filed on Jul. 2, 2018.

(51) Int. Cl.
*G06T 7/00* (2017.01)
*G06T 17/00* (2006.01)
(Continued)

(52) U.S. Cl.
CPC .......... *G06T 7/001* (2013.01); *G06K 9/00201* (2013.01); *G06T 7/13* (2017.01);
(Continued)

(58) Field of Classification Search
CPC .............. G06T 7/001; G06T 7/62; G06T 7/73
(Continued)

(56) References Cited

U.S. PATENT DOCUMENTS 8,391,592 B2   3/2013   Han et al.
8,761,439 B1   6/2014   Kumar et al.
(Continued)

FOREIGN PATENT DOCUMENTS

JP    H09-189526 A   *   7/1997   ............ E04G 21/12
JP    2014002536 A   *   1/2014   ............ G06Q 50/06
(Continued)

OTHER PUBLICATIONS

Han_2013 (Han, K., Gwak, JY., Golparvar-Fard, M., Vision-Based Field Inspection of Concrete Reinforcing Bars, Proceedings of the 13th International Conference on Construction Applications of Virtual Reality; Oct. 30-31, 2013, London UK) (Year: 2013).*
(Continued)

*Primary Examiner* — Brian S Cook
(74) *Attorney, Agent, or Firm* — Moser Taboada

(57) ABSTRACT

Embodiments of the present invention generally relate to computer aided rebar measurement and inspection systems. In some embodiments, the system may include a data acquisition system configured to obtain fine-level rebar measurements, images or videos of rebar structures, a 3D point cloud model generation system configured to generate a 3D point cloud model representation of the rebar structure from information acquired by the data acquisition system, a rebar detection system configured to detect rebar within the 3D point cloud model generated or the rebar images or videos of the rebar structures, a rebar measurement system to measure features of the rebar and rebar structures detected by the rebar detection system, and a discrepancy detection system configured to compare the measured features of the
(Continued)

rebar structures detected by the rebar detection system with a 3D Building Information Model (BIM) of the rebar structures, and determine any discrepancies between them.

23 Claims, 17 Drawing Sheets

(51) Int. Cl.
*G06K 9/00* (2006.01)
*G06T 7/13* (2017.01)
*G06T 7/62* (2017.01)
*G06T 7/40* (2017.01)
*G06T 7/73* (2017.01)

(52) U.S. Cl.
CPC ............... *G06T 7/40* (2013.01); *G06T 7/62* (2017.01); *G06T 7/73* (2017.01); *G06T 17/00* (2013.01); *G06T 2200/24* (2013.01); *G06T 2207/10028* (2013.01); *G06T 2207/20072* (2013.01); *G06T 2207/20081* (2013.01); *G06T 2207/30108* (2013.01)

(58) Field of Classification Search
USPC ............................................................ 703/1
See application file for complete search history.

(56) References Cited

U.S. PATENT DOCUMENTS

| | | |
|---|---|---|
| 9,031,809 B1 | 5/2015 | Kumar et al. |
| 9,476,730 B2 | 10/2016 | Samarasekera et al. |
| 2019/0325089 A1* | 10/2019 | Golparvar-Fard ........................... G06Q 10/0633 |

FOREIGN PATENT DOCUMENTS

| | | | | |
|---|---|---|---|---|
| JP | 2015001146 A | * | 1/2015 | ............. E04G 21/12 |
| JP | 2017151026 A | * | 8/2017 | ............. G01C 11/06 |

OTHER PUBLICATIONS

Kyriazis_2007 (Detecting Features from Sliced Point Clouds, Proceedings of the Second International Conference on Computer Graphics Theory and Applications, GRAPP, 2007) (Year: 2007).*
Issa_2005 (An Experimental Study of Welded Splices of Reinforcing Bars, Building and Environment 41 2006 1394-1405). (Year: 2006).*
Yang_2017 (Stereo Image Point Cloud and LIDAR Point Cloud Fusion for the 3D Street Mapping, IGTF 2017, Mar. 11-17, 2017). (Year: 2017).*
Duan_2015 (Vanishing Points Detection and Line Grouping for Complex Building Fagade Identification, WSCG 2010). (Year: 2015).*
Yang_2016 (Object contour with a fully convolutional encoder-decoder network, Proc. IEEE Conf. Comput. Vis. Pattern Recognit., pp. 193-22, 2016). (Year: 2016).*
Jian_2009 (texture image classification using visual perceptual texture features and Gabor Wavelet Features, Journal of Computers, vol. 4, No. 8, Aug. 2009). (Year: 2009).*
Jorgensen_2015 (Geometric Edge Detection and Classification in Point Clout Data with Application to 3D Object Recognition, Scritepress 2015). (Year: 2015).*

* cited by examiner

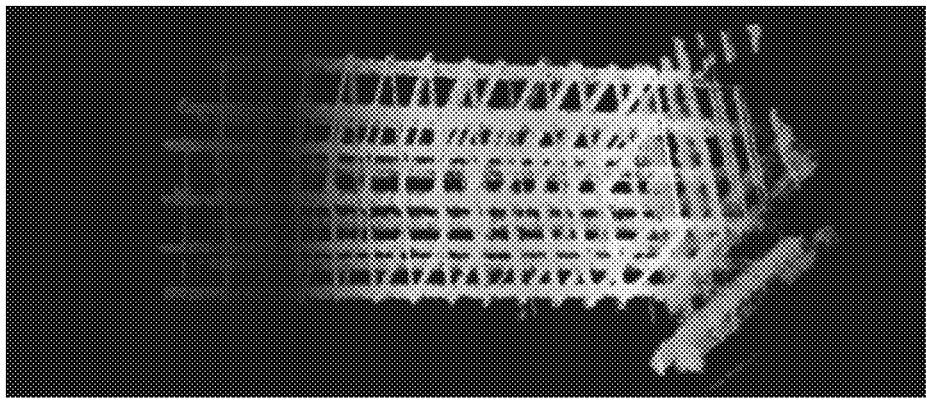
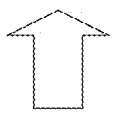
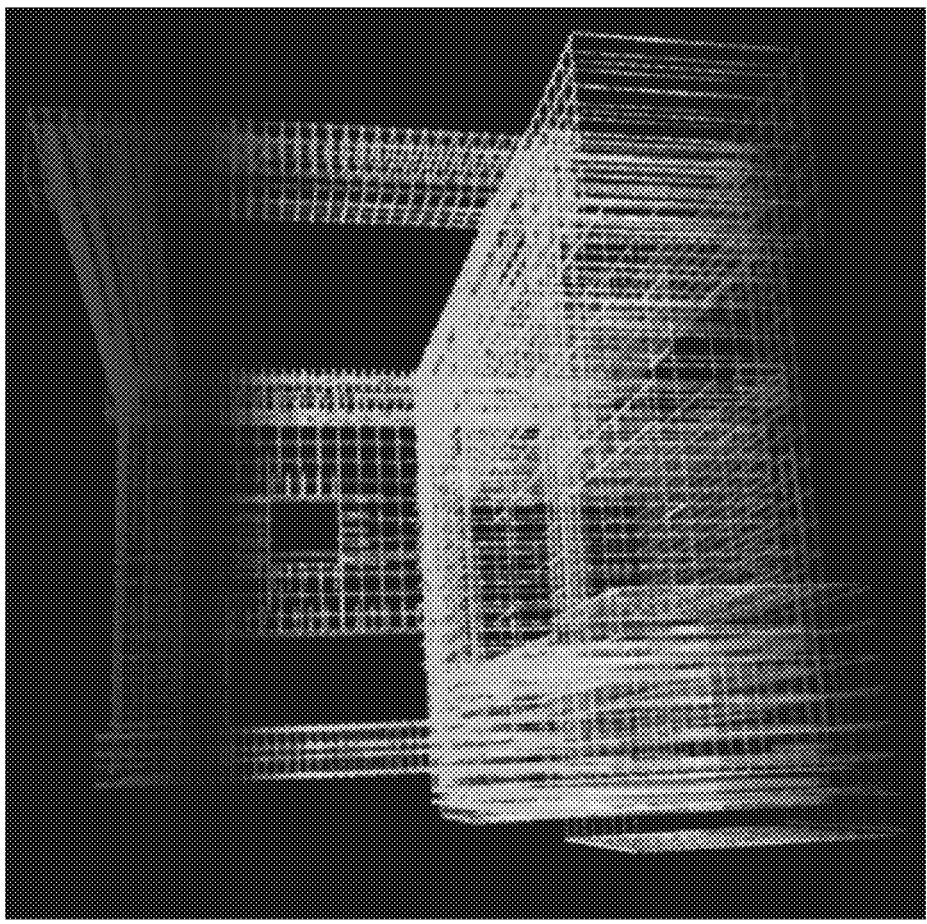
FIG. 13B
FIG. 13A

COMPUTER AIDED REBAR MEASUREMENT AND INSPECTION SYSTEM

CROSS-REFERENCE

This application claims the benefit of U.S. Provisional Application No. 62/692,891 filed on Jul. 2, 2018. The entire content of Application No. 62/692,891 is incorporated herein by reference.

FIELD

Embodiments of the present invention generally relate to computer aided rebar measurement and inspection systems.

BACKGROUND

A problem faced on building construction sites is a rigorous inspection needs to be done after each stage of construction. The impact of undetected errors is huge since the builder may need to replace parts or a whole building. Critical in this process is inspecting the rebar structure before concrete is poured over the rebars. Currently inspection rebar is done manually. This is a very slow and tedious process that must be performed to ascertain compliance of the rebar to design plans, building codes, building models, etc. As labor costs increase and finding skilled labor to perform inspections, and associated repairs/maintenance as required, it becomes prohibitively expensive to perform manual inspections, both in manpower costs and delays waiting for inspections to be completed.

In many cases, certain mistakes are too costly to fix after a certain point. Thus, construction/work cannot continue on certain structures until the inspection is completed. Therefore, it is necessary to ensure that various aspects of the construction are done according to plan/code. Furthermore, to inspect large scale structures and construction sites having thousands of rebar structures, it requires a lot of time and manpower to search the site for the rebar to be inspected, carry all the necessary drawings/plans, inspect the site, mark any inconsistencies, etc.

Thus, there is a need to replace tedious and slow manual work with system and methods that can assist in performing automated fine level inspections of rebar and comparisons to existing building plans.

SUMMARY

Embodiments of the present invention generally relate to computer aided rebar measurement and inspection systems. In some embodiments, a computer aided rebar measurement and inspection system includes a data acquisition system configured to obtain fine-level rebar measurements of a rebar structure and/or rebar images or videos of the rebar structures, a 3D point cloud model generation system configured to generate a 3D point cloud model representation of a rebar structure from the rebar measurements and/or rebar images/videos acquired by the data acquisition system, a rebar detection system configured to detect rebar within at least one of the 3D point cloud model generated or the rebar images or videos of the rebar structures acquired by the data acquisition system, a rebar measurement system to measure features of the rebar and rebar structures detected by the rebar detection system, and a discrepancy detection system configured to compare the measured features of the rebar structures detected by the rebar detection system with a 3D Building Information Model (BIM) of the rebar structures, and determine any discrepancies between them.

In some embodiments, a computer aided rebar measurement and inspection method may include acquiring fine level measurements and/or images of a rebar structure from a first set of high-resolution sensors configured to obtain mm level measurements; generating a 3D point cloud representation of the rebar structure using the fine level measurements and/or images of a rebar structure acquired; detecting rebars in the 3D point cloud representation and/or images of the rebar structure; determining measurements and information of said detected rebars; comparing a 3D building information model (BIM) of the rebar structure with the measurements and information determined about the detected rebars; and detecting discrepancies between the rebars detected and the BIM.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 13A depicts a point cloud representation of the building information model (BIM) in accordance with at least one embodiment of the present principles.

FIG. 13B depicts a 3D point cloud model generated from data acquired by the data acquisition system in accordance with at least one embodiment of the present principles.

Figure 1:
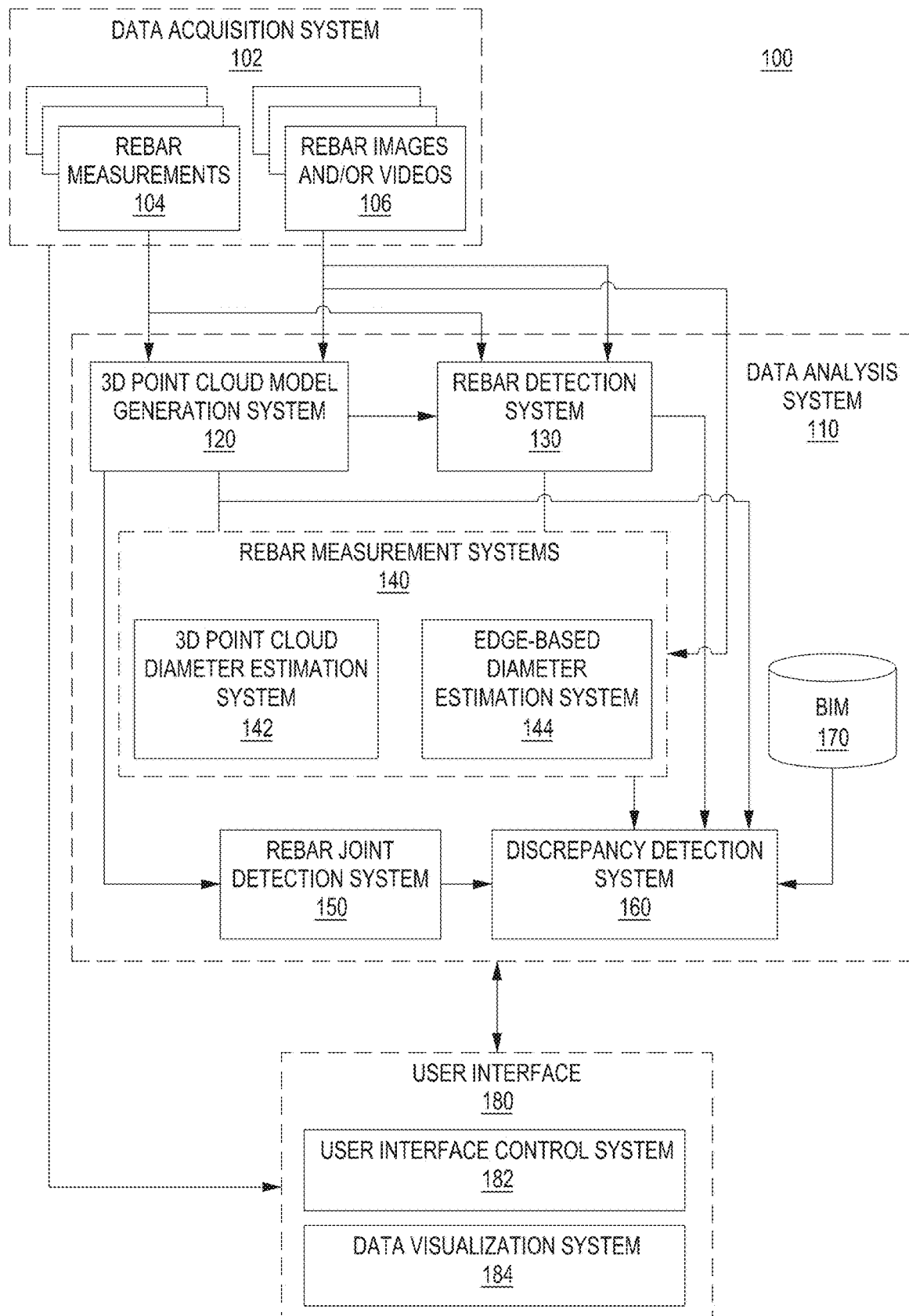
FIG. 1 high-level block diagram of a computer aided rebar measurement and inspection system (CARMIS) in accordance with embodiments of the present principles.
Figure 2:
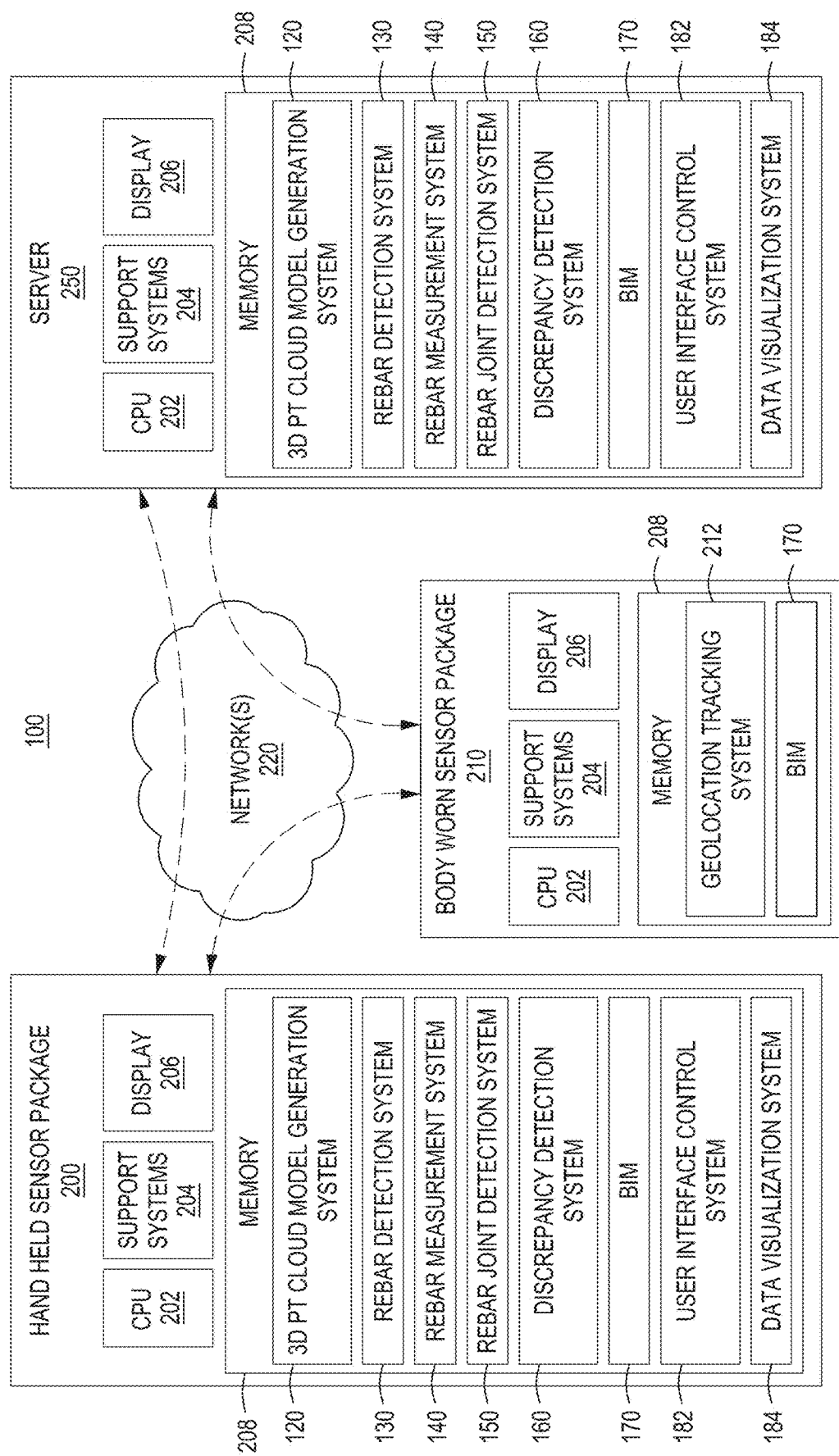
FIG. 2 depicts and additional representation of a high-level block diagram of a computer aided rebar measurement and inspection system (CARMIS) in accordance with embodiments of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of a computer aided rebar measurement and inspection system ("CARMIS") are described herein. This disclosure describes inventive concepts with reference to specific examples. However, the intent is to cover all modifications, equivalents, and alternatives of the inventive concepts that are consistent with this disclosure. Numerous specific details are set forth, such as number of steps, types of cameras, positioning of the camera, types of images used, pitch measurements, BIM models, methodologies for rebar axis estimation display with differing visualization, etc., in order to provide a thorough understanding of the present design. It will be apparent, however, to one of ordinary skill in the art that the present design can be practiced without these specific details. Thus, the specific details set forth are merely exemplary. Also, the features implemented in one embodiment may be implemented in another embodiment where logically possible. The specific details can be varied from and still be contemplated to be within the spirit and scope of the present design. The CARMIS simplifies the inspection task in multiple ways including, but not limited to: 1) allowing a user to visually compare the constructed rebar structure to the plan (a building information model (BIM)); and 2) automatically measuring rebar properties (count, diameter, position, etc.), comparing to the BIM model, and generating a compliance report.

To accomplish this, embodiments of the present invention may: 1) detect, group and geo-locate rebars at each area; 2) make high-accuracy local measurements (millimeter-level); 3) compare constructed rebars to the BIM; 4) overly the BIM on an image of the scene to enable live comparison; and 5) provide an interface and visualization system for user interaction and display of results. The impact of such a system is that it simplifies the inspection process and will reduce the time and number of people needed for inspection. This translates to shorter construction time and reduced cost. As an added benefit, adopters would save time and resources using the invention.

Embodiments of the present invention can ascertain the compliance of the construction of rebar structure with respect to the BIM. To accomplish this, the system replaces tedious and slow manual work with an automatic system that, in at least some embodiments: acquires 3D measurements and images from the scene using a cameras and other sensors (e.g., such as a trinocular stereo camera system) to get mm-level local measurements of the rebar structure; detects rebars in 3D point clouds and/or images; measures rebar assembly (e.g., number, diameter, pitch, etc.) using rebar segmentation and diameter estimation from 3D data and image edges; detects rebar joints (welded or mechanically coupled); detects discrepancies between rebar construction and the BIM; refines alignment between the 3D point clouds measured to the 3D model provided by the BIM; and compares detected rebar with those in the BIM.

Various embodiments of the computer aided rebar measurement and inspection system ("CARMIS") and methods and, more particularly, to methods and systems for using augmented reality and localization techniques to assist in performing fine level inspections and comparisons to 3D model of rebar structures, are now described in detail with respect to FIGS. 1-9.

FIG. 1 depicts a high-level block diagram of a computer aided rebar measurement and inspection system (CARMIS) 100 in accordance with embodiments of the present principles. The CARMIS 100 includes a data acquisition system 102, a data analysis system 110, and a user interface 180. In some embodiments, the data acquisition system 102, data analysis system 110, and user interface 180 may be disposed on a single device, such as hand-held sensor package 200 as described below with respect to FIG. 2. In other embodiments, the data acquisition system 102, data analysis system 110, and user interface 180, or portions thereof, may be distributed across multiple devices and servers communicatively couple to each other as described below with respect to FIG. 2.

The data acquisition system 102 may be any device, or plurality of devices, able to obtain fine-level measurements 104 of a rebar structure and/or images or videos 106 of the rebar structures. In some embodiments, the rebar fine-level measurements 104 may include inertial measurement unit (IMU) data, depth information, and/or other information from barometer, altimeter, magnetometer, GPS, and other sensors/devices included in the data acquisition system 102. In some embodiments, the images and videos 106 of the rebar structures may include one or more frames of stereo images obtained from stereo cameras.

Figure 3:
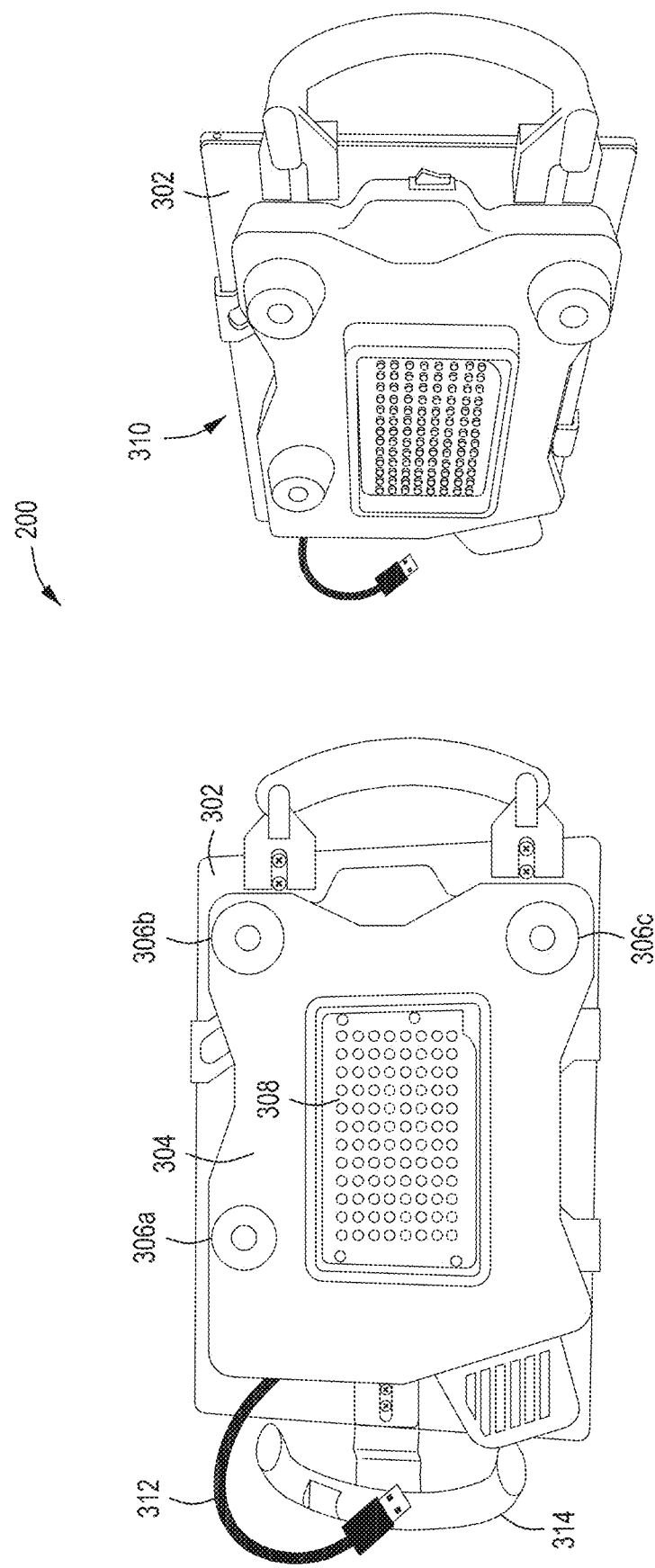
FIG. 3 depicts at least one embodiment of a data acquisition system including a handheld sensor and display package in accordance with at least one embodiment of the present principles.

For example, in some embodiments, the data acquisition system 102 may by a hand-held sensor package/device 200 as described in detail in FIG. 3. The hand-held sensor package/device 200 can obtain local relative measurements, and fine resolution images and videos, of the rebar structures that yields higher resolution by working with a narrower field of view. In some embodiments, the hand-held sensor package/device 200 used for local fine level relative measurements at a mm level of precision (e.g., about a 0.1 mm to about a 10 mm level precision, or in some embodiments, about a 1 mm to about a 5 mm level precision) includes a handheld device, such as a tablet 302, that may include one or more cameras, a trinocular camera 306*a*-*c*, a high-resolution range sensor, inertial measure unit (IMU) 310, GPS, visualization capabilities, illuminator for lighting 308, etc., as shown in FIG. 3. The handheld tablet 302 may also include handles 314 and a communication cable 312 (i.e., such as a USB cable) for transferring data. In some embodiments, data acquisition system 102 (e.g., the hand-held sensor package 200) is configured to capture stereo images and information and IMU data by scanning a rebar section with tablet 302. The tablet 302 may include three cameras able to capture images of at least 2 MP or more and having a 20-60-degree field of view (e.g., a 40-degree field of view). In some embodiments, the IMU data is used to generate a pose estimate. In other embodiments, feature correspondence or other methodologies are used to get the initial pose.

Figure 4A:
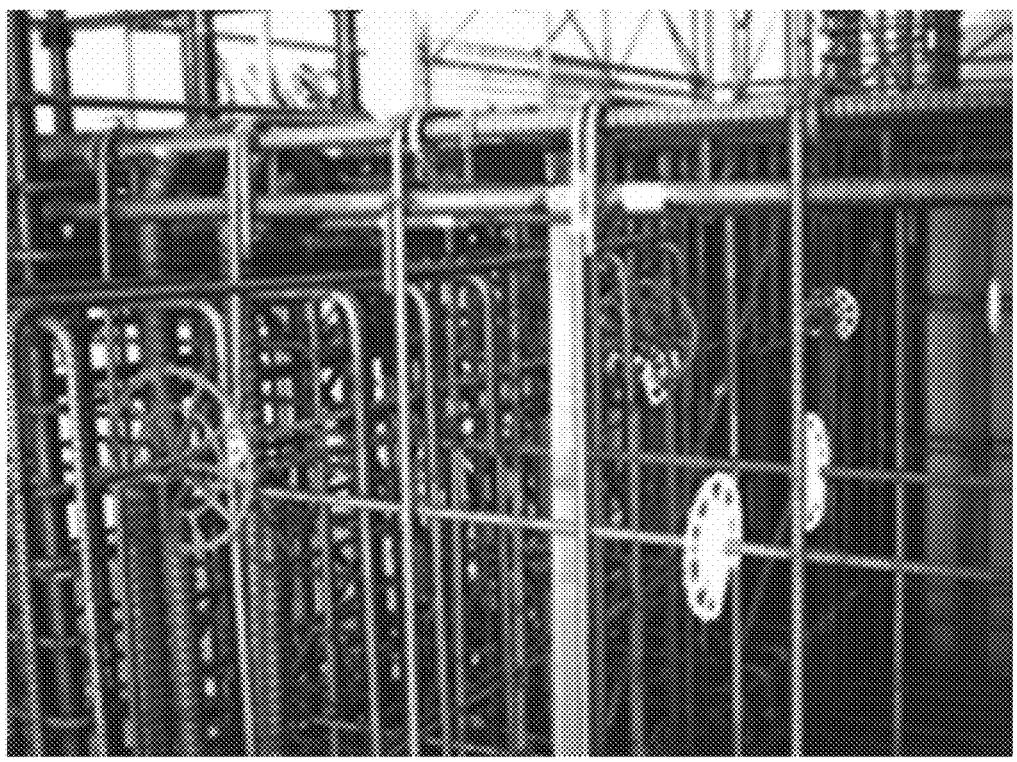
FIG. 4A depicts a stereo image of a rebar structure acquired by a data acquisition system in accordance with at least one embodiment of the present principles.
Figure 4B:
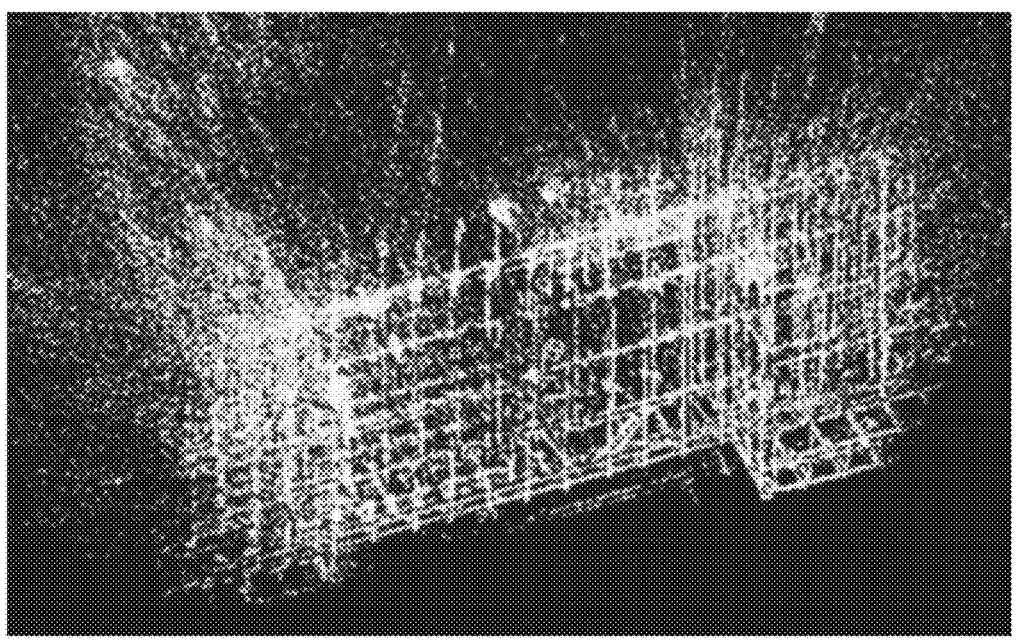
FIG. 4B depicts a 3D point cloud model of the rebar structure generated from the data acquired by the data acquisition system in accordance with at least one embodiment of the present principles.

The data analysis system 110 includes 3D point cloud model generation system 120 that acquires a 3D representation of the scene (e.g., the rebar structure) from the rebar measurements 104 and rebar images/videos 106 from the data acquisition system 102, and generates a 3D point cloud of the rebar structure being analyzed. In some embodiments, depth of the rebar structure can be acquired/determined by the 3D point cloud model generation system 120 through the use of stereo from a single image or video frame. In some embodiments, multiple images or video frames are used to cover a wider field of view and obtain a denser 3D point cloud. For example, as shown in FIGS. 4A and 4B, a stereo image of a rebar structure in FIG. 4A is acquired by the data acquisition system 102 and provided to the 3D point cloud model generation system 120. The 3D point cloud model generation system 120 then generates a 3D point cloud model of the rebar structure in FIG. 4B. In some embodiments, the 3D point cloud model generation system 120 processes the measurements 104 of a rebar structure and/or images and videos 106 of the rebar structures (e.g., trinocular stereo data and IMU data received from data acquisition system 102) using at least one of dense stereo point cloud integration techniques and/or bundle adjustment techniques to compute integrated 3D points of a scanned area of the rebar structure. Bundle adjustment is run to refine the camera poses and 3D point locations corresponding to each rebar in the rebar structure. The Bundle adjustment algorithms use the fact that the relative motion between the multiple stereo cameras of the data acquisition unit is constant over time and it is known from calibration to fix the scale of the 3D reconstruction. The 3D point cloud model generation system 120 first runs visual navigation on the input video sequence to obtain initial pose estimates for each image. Based on these poses a subset of images (key-frames) is selected for 3D recovery. Next, feature tracks are generated across multiple frames. The 3D point cloud model generation system 120 then uses the refined poses to integrate points generated from dense disparity maps. Finally, the 3D point clouds from each stereo pair are aggregated to generate a dense point cloud for the inspected rebar structure.

The data analysis system 110 further includes a rebar detection system 130 to detect rebars. The rebar detection system 130 uses one or more of many different subsystems, types of information, and algorithmic techniques to accurately detect the rebar in the structures being analyzed as described below in further detail.

Figure 5:
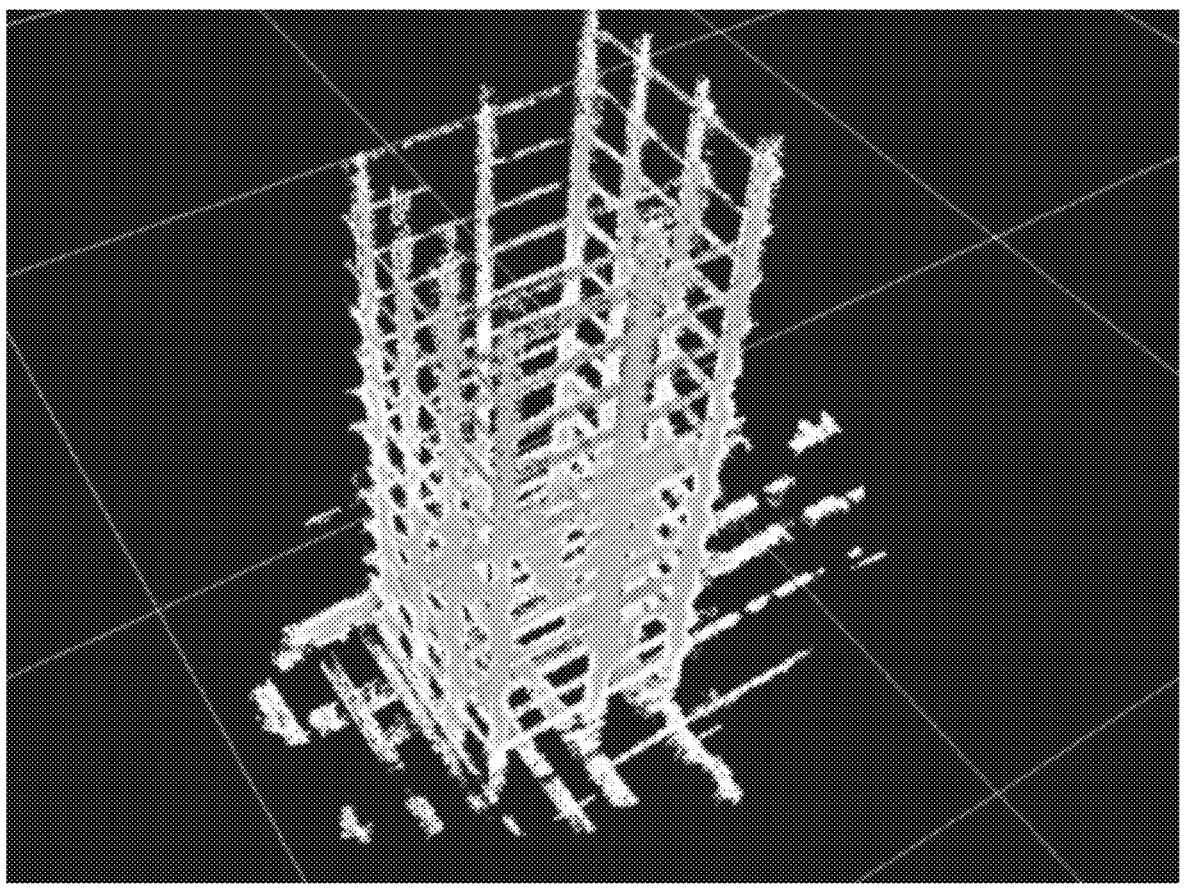
FIG. 5 depicts a refined 3D point cloud model of the rebar structure in accordance with at least one embodiment of the present principles.
Figure 6:
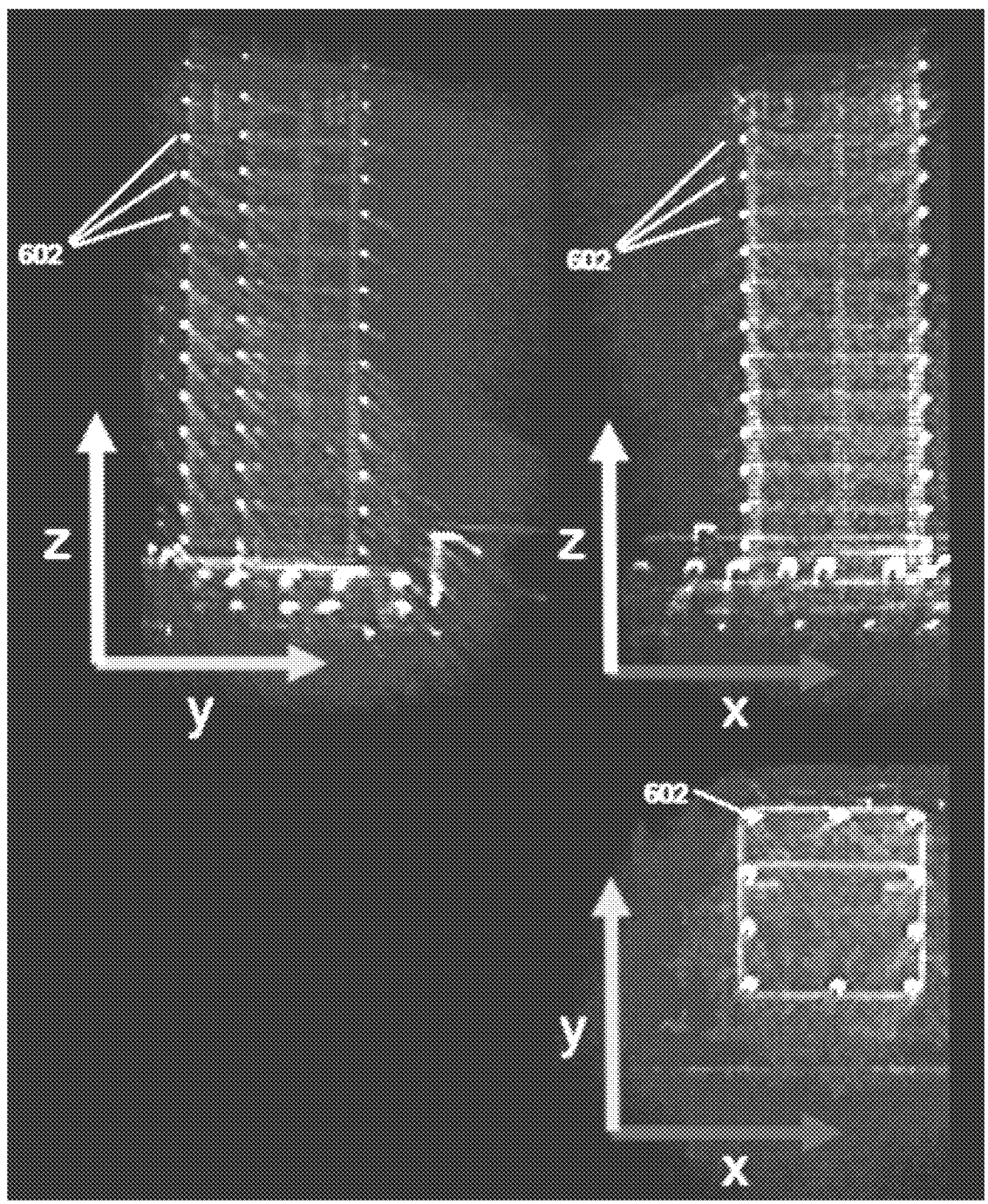
FIG. 6 depicts a 2D histogram representation of the refined 3D point cloud model in FIG. 5 in accordance with at least one embodiment of the present principles.

In some embodiments, the rebar detection system 130 detect rebars from the integrated 3D point cloud by refining the point cloud to remove outliers (also referred to as pruning or filtering the point cloud). The refined 3D point cloud after rebar detection is depicted in FIG. 5. As shown in FIG. 5, the rebar in the rebar structure can clearly be recognized. After the rebar detection system 130 generates the refined 3D point cloud, the cleaned 3D point cloud is represented in a 2D histogram to facilitate rebar detection. In some embodiments, the rebar detection system 130 detects peaks 602 in the histogram of projected 3D point clouds on the x-y, x-z, and y-z planes perpendicular to rebars along the horizontal and vertical direction as shown in FIG. 6. The diameter can be roughly estimated from the size of peak areas 602. The diameter is refined using multiple frames using edge information (e.g., from images/videos 106)—this offers increased accuracy and precision of the estimates. As shown in FIG. 6, the peaks 602 are a count (i.e., histogram) of the data points collected for each rebar—i.e., the rebar ends show up as peaks because many points land in the same location and that value there gets higher. That's used to both localize the bars and also filter out the noise because the noise (i.e., the grey area around the peaks).

Figure 7:
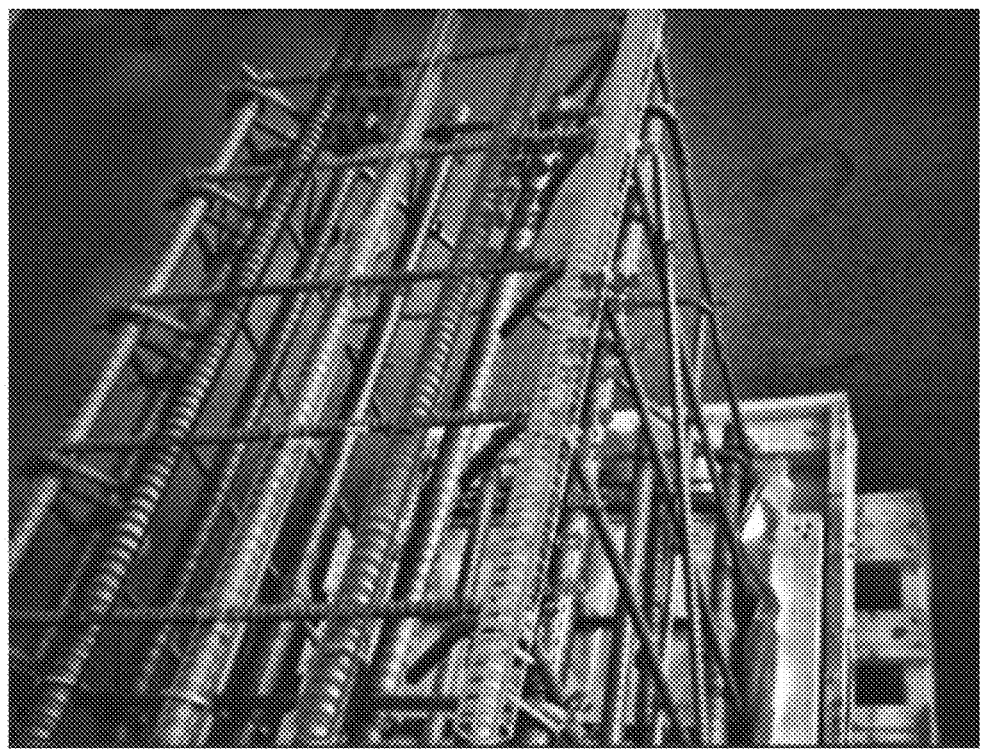
FIG. 7 depicts sets of similar rebar detected in frames of stereo images of roughly parallel bars using rebar features in accordance with at least one embodiment of the present principles.

In some embodiments, the rebar detection system 130 detects rebars using the stereo rebar images/video 106 and/or rebar measurements 104. The rebar detection system 130 may detect rebar sets in frame of stereo images of roughly parallel bars using features such as rebar with similar diameter, rebar forming a plane, and possibly regularly spaced rebar as shown in FIG. 7. The rebar detection system 130 may use techniques such as vanishing point detection (i.e., geometric notion where parallel lines meet at a point and vanish), non-maximum suppression or other heuristic for rebar detection, or for detecting sets of rebar. Non-maximum suppression is a technique where the system identifies/detects some rebar—and therefore the system knows that the bars have some spacing there. Thus, if the system detecting a rebar, then it can assume that around that location it doesn't expect to see any more rebar, and looks a little further away from the detected rebar to detect other rebar.

Figure 8:
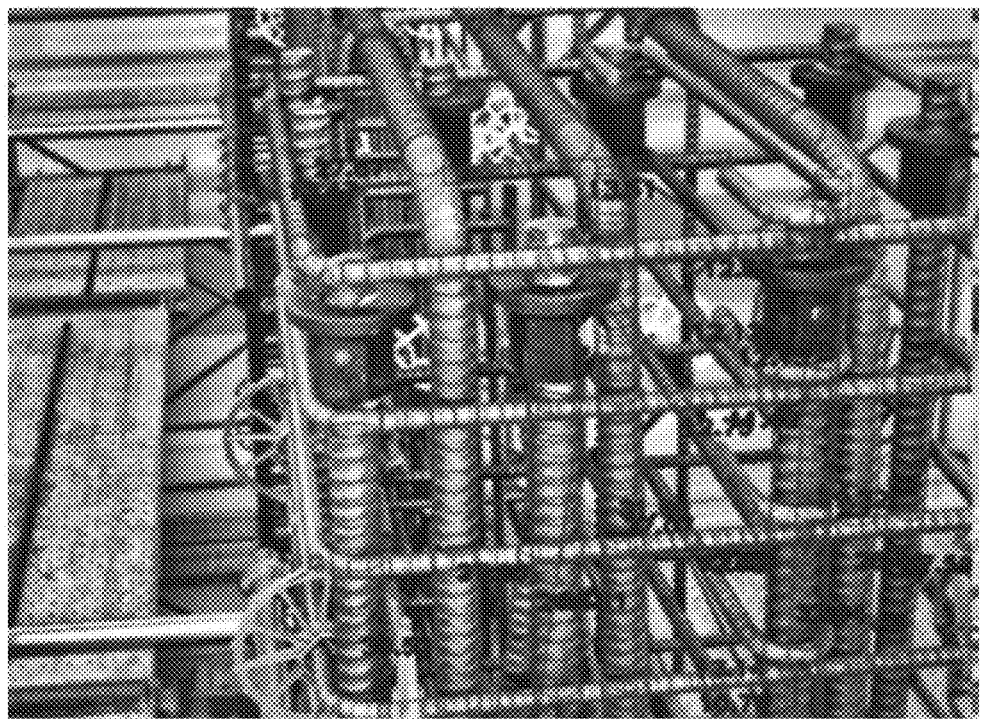
FIG. 8 depict sets of rebar that have been manually annotated in stereo images in accordance with at least one embodiment of the present principles.

One of the main challenges for the rebar detection system 130 is the precision of edge detection of the rebar. Precision/recall of boundary detection affects rebar detection and edge localization affects diameter estimation. As noted above, about a 0.1 mm to about a 10 mm level precision, or in some embodiments, about a 1 mm to about a 5 mm level precision, is achieved. The user creates a precisely annotated dataset by manually annotating each rebar's image boundary and extent (segments) as shown in FIG. 8. Then the 3D geometry can be recovered from annotations. The annotations are then turned into an occlusion mask to train edge detection using model training systems such as the structured random forest. The annotations are saved/stored as coordinates (locations within the images) for all the edges and the diameters.

An appearance detector can also be trained for rebar texture detection. Some exemplary model/training techniques that can be used include histograms of oriented gradients (HOG), Support Vector Machines (SVM), conditional random field (CRF) which is a kind of discriminative model for sequential data, pix2pix, CNN, and the like. The 3D geometry is recovered and physical deviations from model and assumptions (BIM, rebar alignment) can be analyzed to determine the rebar texture. Evaluation can be done use boundary detection PR curves, rebar detection PR curves, and radius/localization error distributions.

One of the goals of the rebar detection system 130 includes the ability to detect the texture appearance of rebars of different types, at different depths. The periodic pattern of the texture can be detected using pixel wavelength which depends on bar type and distance to camera. For example, Gabor wavelets can be used to detect localized pixel wavelength. Correlation can then be used for pattern matching. As an example, rebar texture can be matched: (1) along length of given rebar; (2) along rebars of similar orientation/type.

As discussed above, multi-frame or single time instant stereo images can be used to generate the 3D point cloud by the 3D point cloud model generation system 120. Similarly, the rebar detection system 130 can use multi-frame or single time instant stereo images to detect rebar. This method has the advantages that it can incorporate the range from stereo to reduce the number of rebar hypotheses that need to be verified, and combine horizontal and vertical stereo to get good range estimates on all rebars (vertical and horizontal).

Figure 9:
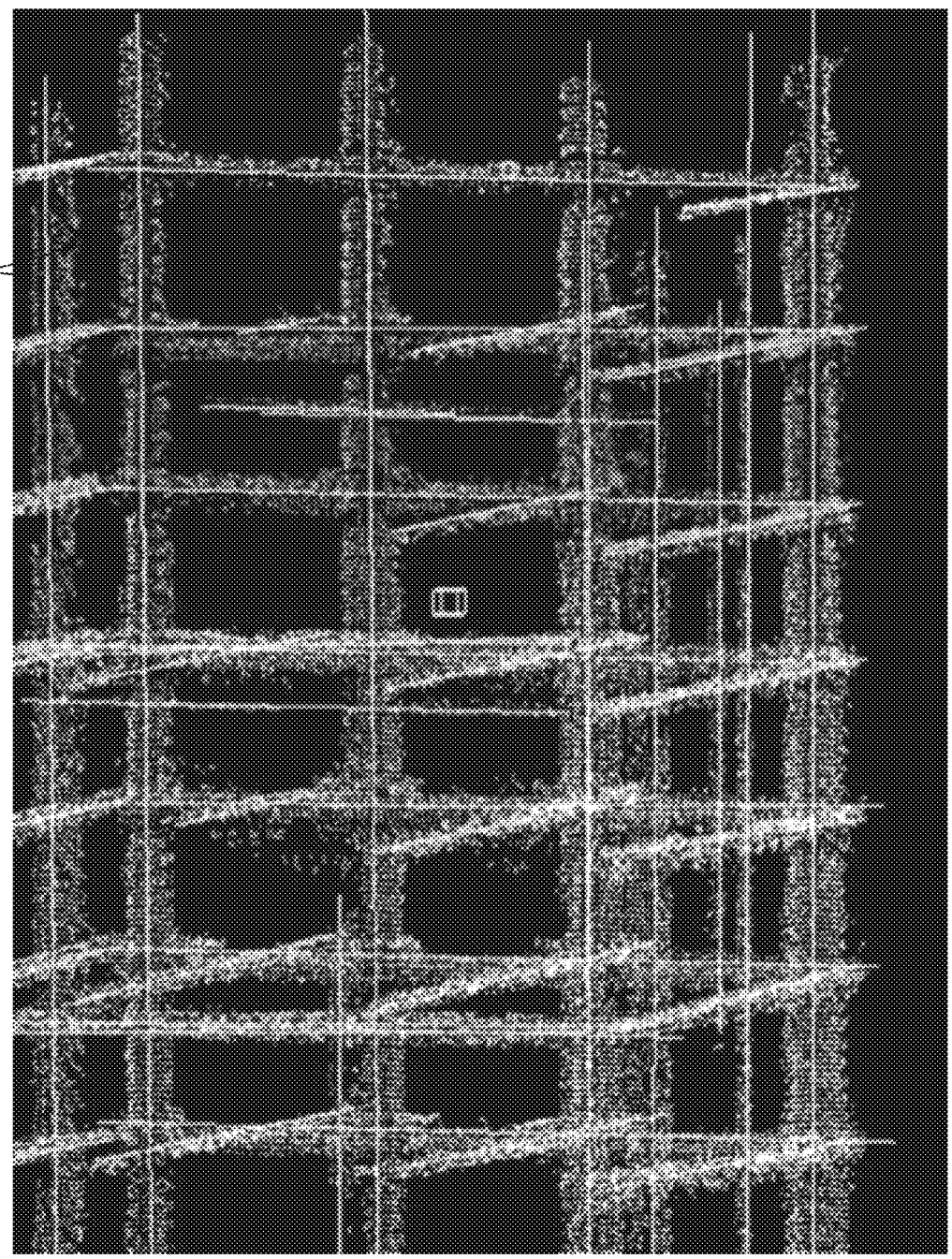
FIG. 9 depicts a 3D point cloud model of a rebar structure with a refined axis estimate overlaid on the 3D point cloud model in accordance with at least one embodiment of the present principles.

The rebar detection system 130 also performs a refined rebar axis estimation to determine the axis of the rebar structure. Specifically, the rebar detection system 130 uses rebar segmentation to compute a bounding box around each rebar segment. Then an axis estimate is refined for each rebar and the estimated axis 902 is overlaid on the 3D point cloud model as shown in FIG. 9. This allows for (1) estimation of the angle between rebar segments and a rebar segment and main axes, and (2) more precise pitch measurements, for bars that are not aligned with one of the axes.

The data analysis system 110 further includes a rebar measurement system 140 to measure features of the rebars and rebar structures detected by the rebar detection system 130 (e.g., measuring the number, diameter, pitch, etc. of the rebar and rebar structures). The rebar measurement system 140 includes one or more systems and employs various techniques for performing these measurements. For example, in some embodiments, the rebar measurement system 140 includes a 3D point cloud diameter estimation system 142 and/or an edge-based diameter estimation system 144, each providing different ways to measure rebar diameter. Each system has its advantages. The 3D point cloud diameter estimation system 142 and an edge-based diameter estimation system 144 are also able to measure pitch and number of rebar, and is not limited to measuring rebar diameters.

For example, edge-based diameter estimation system 144 does not need the dense 3D point cloud, only camera poses and calibration to perform edge detection in order to estimate rebar diameters. Meanwhile, the 3D point cloud diameter estimation system 142 can estimate diameters faster since does not use the computationally expensive edge detection techniques/models. The 3D point cloud diameter estimation system 142 also benefits from stereo disparity maps at full resolution.

Figure 10:
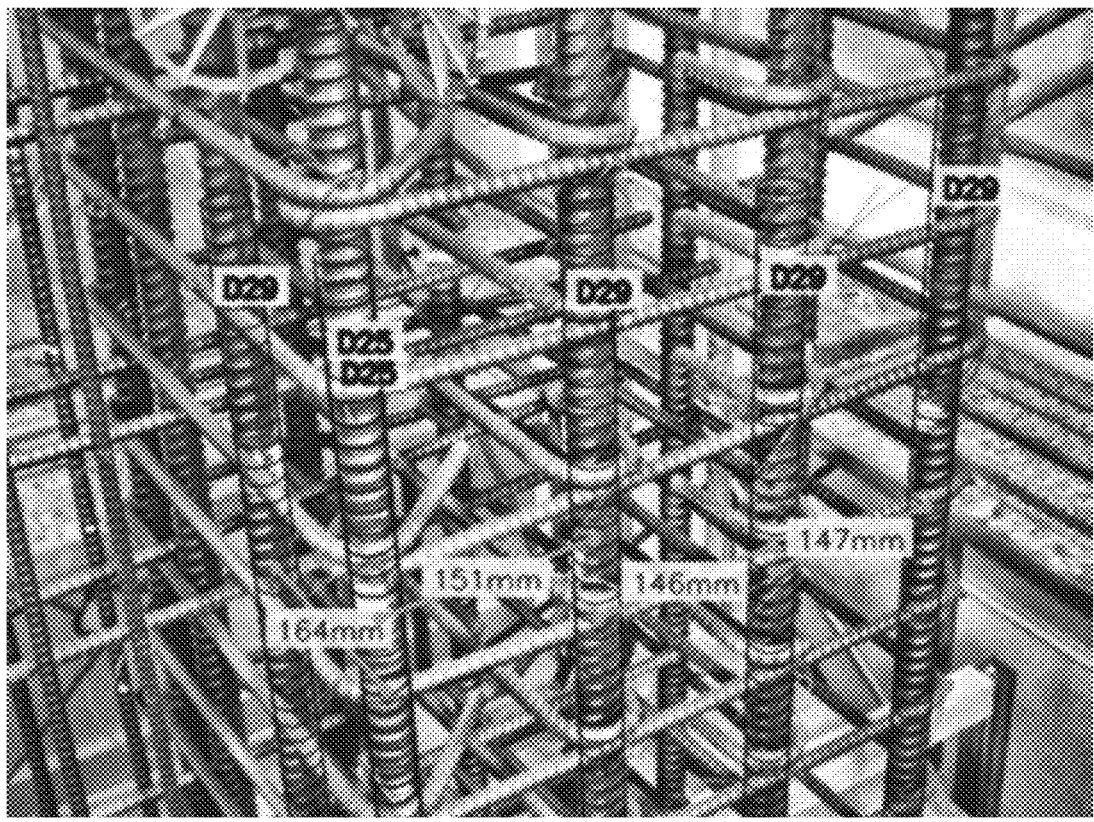
FIG. 10 depicts annotated stereo images of rebar structure including integrated rebar measurements and diameter labels/designations in accordance with at least one embodiment of the present principles.

In some embodiments, the edge-based diameter estimation system 144 may use the precisely annotated dataset annotating each rebar's image boundary and extent (segments) as shown in FIG. 8 in order to determine rebar measurements (e.g., measuring the number, diameter, pitch, etc. of the rebar and rebar structures). In some embodiments, it does so by integrating diameter measurement in the system and/or using a predefined lookup table to convert from diameter estimates to labels as shown in FIG. 10 (e.g., rebar label/designation D29 has a certain diameter and pitch). Specifically, rebar comes in twelve or so possible diameters. The edge-based diameter estimation system 144 adjusts/verifies that the min and max values used for each "D" label matches the actual diameter of the bar.

In some embodiments, diameter estimation is achieved by fitting a circle to the 3D points projected on a plane perpendicular to the rebar axis. In some embodiments, both the 3D point cloud diameter estimation system 142 and the edge-based diameter estimation system 144 approaches are fused to provide more accurate and faster rebar measurements. In other embodiments, for the 3D point cloud approach, only rebar points from the 3D point cloud acquired from cameras close to that rebar are used to improve estimation. In further embodiments, given a rebar cluster, rather than estimating a diameter value and associating that value with discrete rebar designations "D10"-"D57", if two diameter estimation calculations have similar support, report both with a lower confidence value.

In some embodiments, the data analysis system 110 further includes a rebar joint detection system 150 to detect joints (e.g., pressure welded joints of two rebar together or mechanically coupled rebar joints). The rebar joint detection system 150 detects rebar joints by (1) locating all intersections of a rebar with other rebar, (2) section the remaining portion of the rebar (i.e., other than the intersections) with a plane and compute an envelope of all the measured/detected points from the 3D point cloud, and (3) look for "bumps" in the profile of the envelope computing (i.e., portions where the thickness of the rebar point cloud increases). The bumps determined may be compared to a template of a rebar weld profile, or a mechanically coupled rebar joint profiled, to determine if the bump is actually a rebar welded joint or mechanically couple rebar joint.

Figure 11:
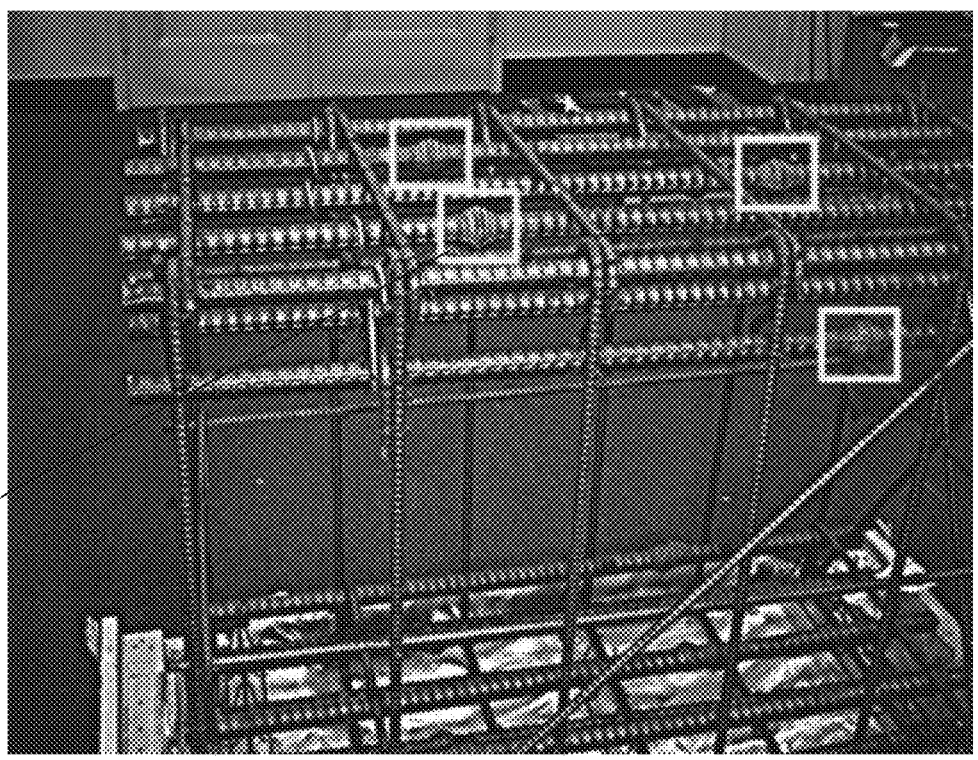
FIG. 11 depicts images of rebar structure including rebar joints in accordance with at least one embodiment of the present principles.
Figure 12:
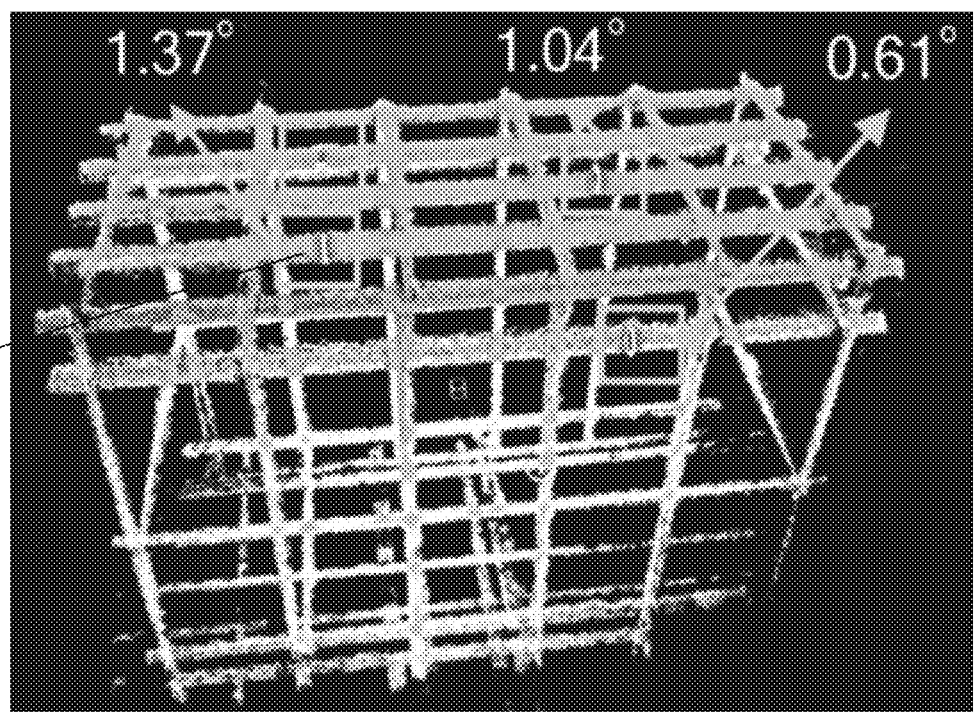
FIG. 12 depicts a 3D point cloud of the images of rebar structure shown in FIG. 11 with the rebar joints automatically detected in accordance with at least one embodiment of the present principles.

In some embodiments, rebar joint detection system 150 uses multiple diameter estimate profiles along the rebar generated by the rebar measurement system 140 to support rebar joint detection. In some embodiments, the system can detect rebar joint and estimate the angle between the two joined rebar segments. Additionally, the system can consider point density to further reduce the number of false alarms. For example, FIG. 11 depicts images of rebar structure including actual rebar joints 1102. FIG. 12 depicts a 3D point cloud of the images of rebar structure shown in FIG. 11 with the rebar joints 1202 automatically detected by the rebar joint detection system 150.

The data analysis system further includes a discrepancy detection system 160 that is configured to compare the measured features of the rebar and rebar structures detected by the rebar detection system 140 and/or joint detection system 150 with the 3D Building Information Model (BIM) 170. The discrepancy detection system 160 performs the comparison with the BIM and determines any discrepancies between the measurements and information obtained about the rebar structure and the BIM of the rebar. The discrepancies are determined and compiled, and a compliance report is generated including those discrepancies or information/summary about the discrepancies. The discrepancies determined between the measurements and information obtained about the rebar structure and the BIM of the rebar structure may include differences in the number of rebars measured versus the number of rebars in the model, differences in the diameter/thickness of the rebar, pitch between each rebar, tensile markings on the rebar, angles of the rebar, etc. The compliance report may include, for example, what was measured and where the discrepancies are. In some embodiments, the measured data is compared to the model data, and values that exceed a predetermined threshold (e.g., 0.1-25% of expected value) may be flagged as a discrepancy and included in the compliance report. In some embodiments, if a measured value exceeds a predefined threshold, the element in error would be repaired/corrected and re-inspected. In some embodiments, the discrepancies may be visually detected by displaying the BIM 170, or portion thereof, overlaid on the 3D point cloud model generated as shown in FIG. 13D.

Figure 13D:
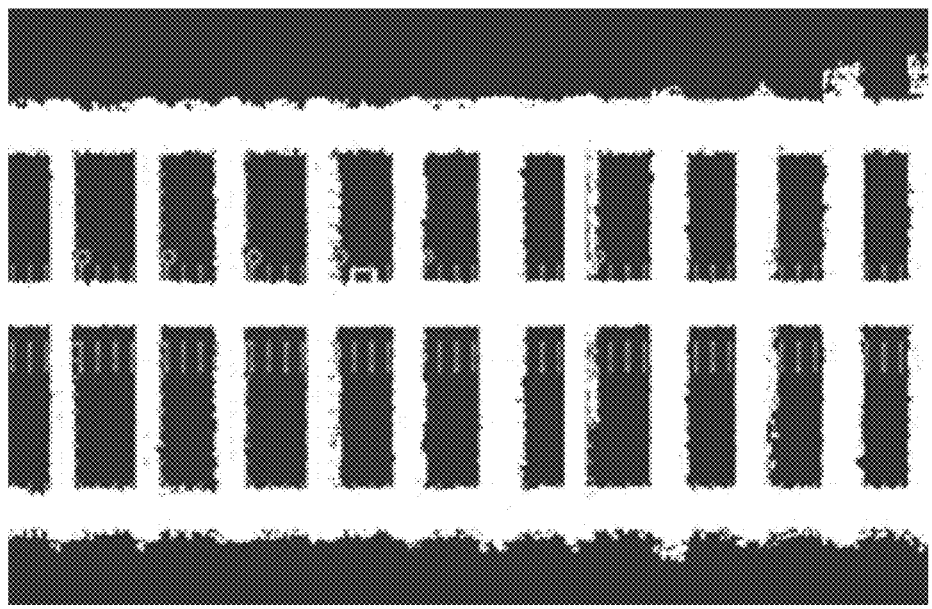
FIG. 13D depicts shows differences between the BIM and the 3D point cloud of the scene in accordance with at least one embodiment of the present principles.
Figure 13C:
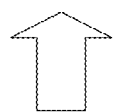
FIG. 13C depicts a cropped portion of the point cloud model of the BIM corresponding to the 3D point cloud model generated by the 3D point cloud model generation system in accordance with at least one embodiment of the present principles.
Figure 13C:
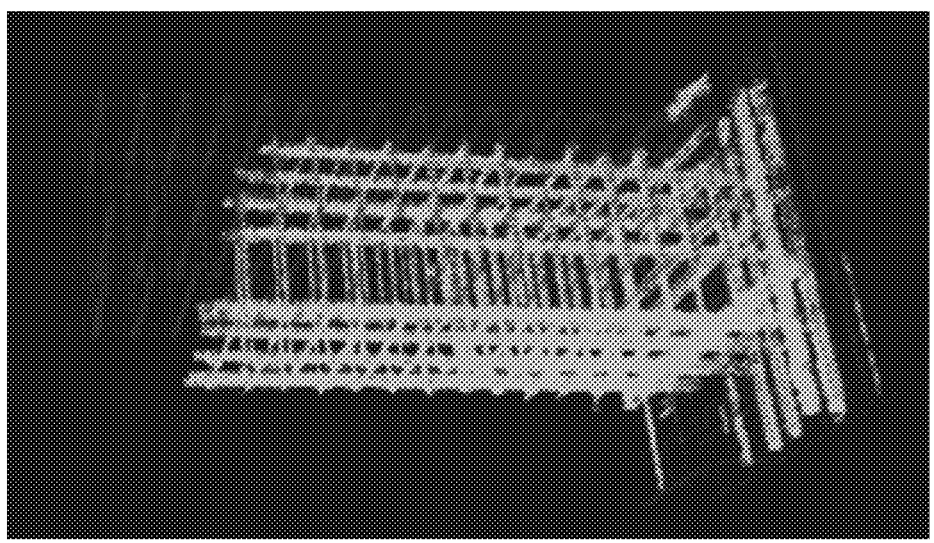

In some embodiments, the discrepancy detection system 160 may first generate a point cloud model from the BIM 170 as shown in FIG. 13A, or may otherwise be provided with a point cloud model from the BIM 170. The discrepancy detection system 160 will then obtain the 3D point cloud model generated by the 3D point cloud model generation system 120 as shown in FIG. 13B. The discrepancy detection system 160 will then crop a portion of the point cloud model of the BIM 170 corresponding to the 3D point cloud model generated by the 3D point cloud model generation system 120 as shown in FIG. 13C. The discrepancy detection system 160 will then refine the alignment of the 3D Point cloud of the scene to the BIM and show the discrepancies between scene and BIM as shown in FIG. 13D. In FIG. 13D, the image shows difference between the BIM with four main rebars and the 3D Point cloud of the scene with three bars.

In some embodiments, the CARMIS 100 includes a user interface 180 that includes a user interface control system 182 and data visualization system 184. In one embodiment, the CARMIS 100 utilizes the user interface control system 182 to provide a user of the system an intuitive and easy to use interface to train, control, and calibrate the system.

Figure 14A:
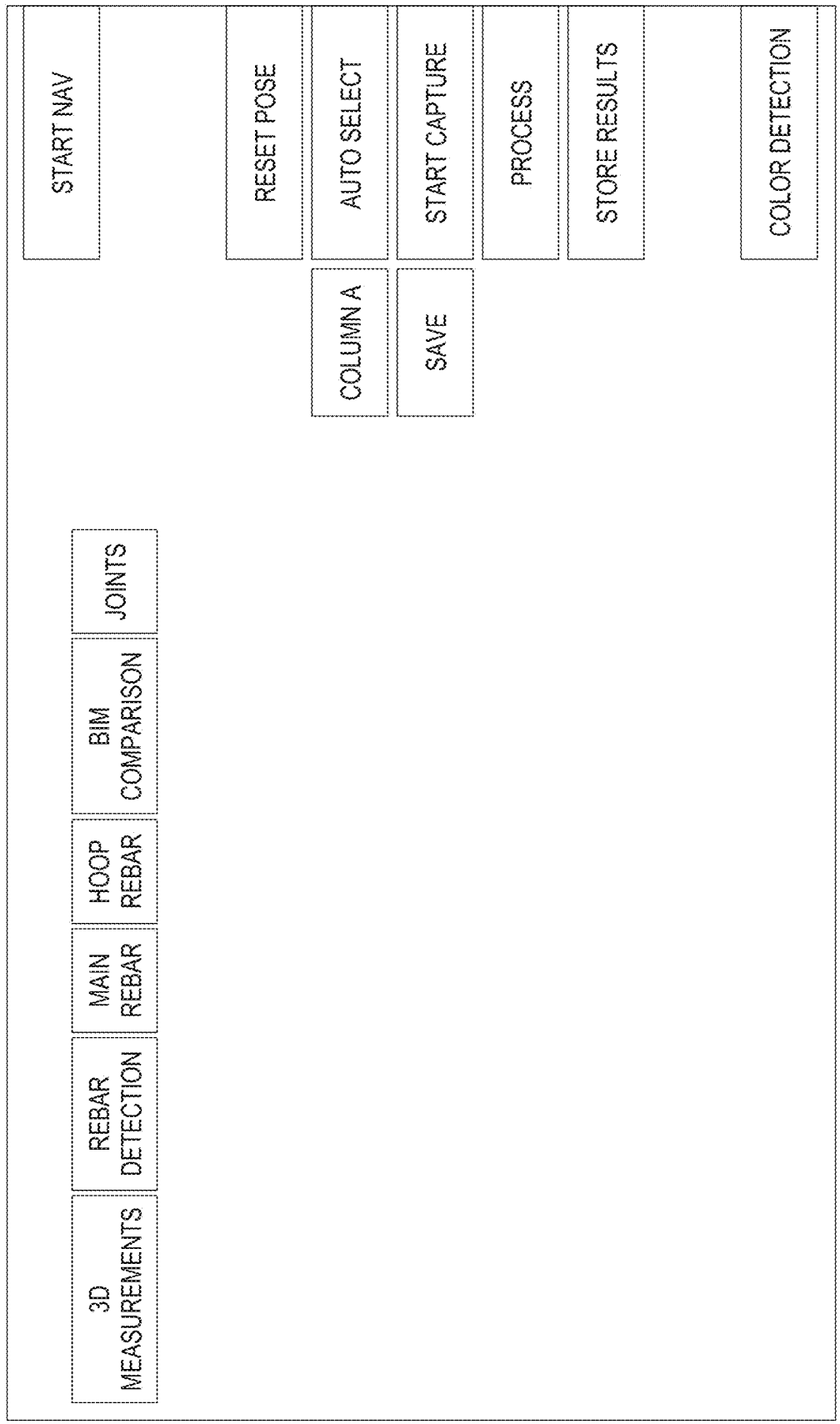
FIG. 14A-14C depict a user interface for a computer aided rebar measurement and inspection in accordance with at least one embodiment of the present principles.

The user interface control system 182 includes interactive buttons such as "Start Nav," "Reset Pose," "Auto Select," Save," "Start Capture," "Process," "Store Results," "Color Detection," "3D Measurements," "Rebar Detection," "Main Rebar," "Hoop Rebar," "BIM Comparison," and "Joints," as shown in FIG. 14A. The "Start Nav" button initializes the sensors and starts the navigation systems and modules. When the initialization process is complete, the user will see live video in the main GUI window of the display. Next step is to initialize the tablet sensor pose in the global (BIM) coordinate frame. To do this, the user selects the "Reset Pose" object. In some embodiments, the following selectable objects may be made available to the user by the user interface control system 182 as shown in Table 1:

(with virtual ruler), etc. The data visualization system 184 can include a display screen to output what the camera is currently capturing or a comparison image of BIM vs. calculated values. The display screen can further include an overlay option to overlay useful information such as current measurements calculated by the system, a ruler to make rough measurements as shown in FIG. 14C, and a whiteboard to with structural information.

As discussed above, and as shown in FIG. 2, the data acquisition system 102, data analysis system 110, and user interface 180 may be disposed on a single device, such as hand-held sensor package 200. In other embodiments, the data acquisition system 102, data analysis system 110, and user interface 180, or portions thereof, may be distributed across multiple devices, such as hand-held sensor package 200, body worn sensor package 210, and servers 250, communicatively coupled to each other via network 220.

The networks/cloud 220 comprise one or more communication systems that connect computers by wire, cable, fiber optic and/or wireless link facilitated by various types of well-known network elements, such as hubs, switches, routers, and the like. The networks 220 may include an Internet Protocol (IP) network or other packet-based communication networks, and may employ various well-known protocols to communicate information amongst the network resources. In some embodiments, hand-held sensor package 200 can communicate directly with body worn sensor package 210, and server 250 through WIFI, BLUETOOTH, or any other wireless or wired communication protocols.

In some embodiments, the hand-held sensor package 200 may comprise a Central Processing Unit (CPU) 202, support systems 204, display 206, memory 208, 3D point cloud model generation system 120, rebar detection system 130, rebar measurement system 140, rebar joint detection system 150, discrepancy detection system 160, BIM 170, user interface 180 including user interface control system 182 and data visualization system 184.

In some embodiments, the server 250 may comprise a Central Processing Unit (CPU) 202, support systems 204, display 206, memory 208, 3D point cloud model generation system 120, rebar detection system 130, rebar measurement system 140, rebar joint detection system 150, discrepancy

TABLE 1

| UI Selectable Objects | | |
|---|---|---|
| Step | Process | Button active when reads |
| 3D Recovery | Generate a dense 3D point cloud from the sequence | Distance Measurements |
| Rebar Detection | Initial clustering of the point cloud to get subsets of the 3D point cloud associated with each rebar hypothesis | Rebar Detection |
| Rebar refinement | Refine axis and diameter estimates for rebar hypotheses along one direction | Main rebar, Hoop rebar |
| BIM Comparison | Align the point cloud to the BIM model for the inspected element and compare detection results with the model | BIM Comparison |
| Joints | Detect joints for bars in a given direction | Joints |

Figure 14B:
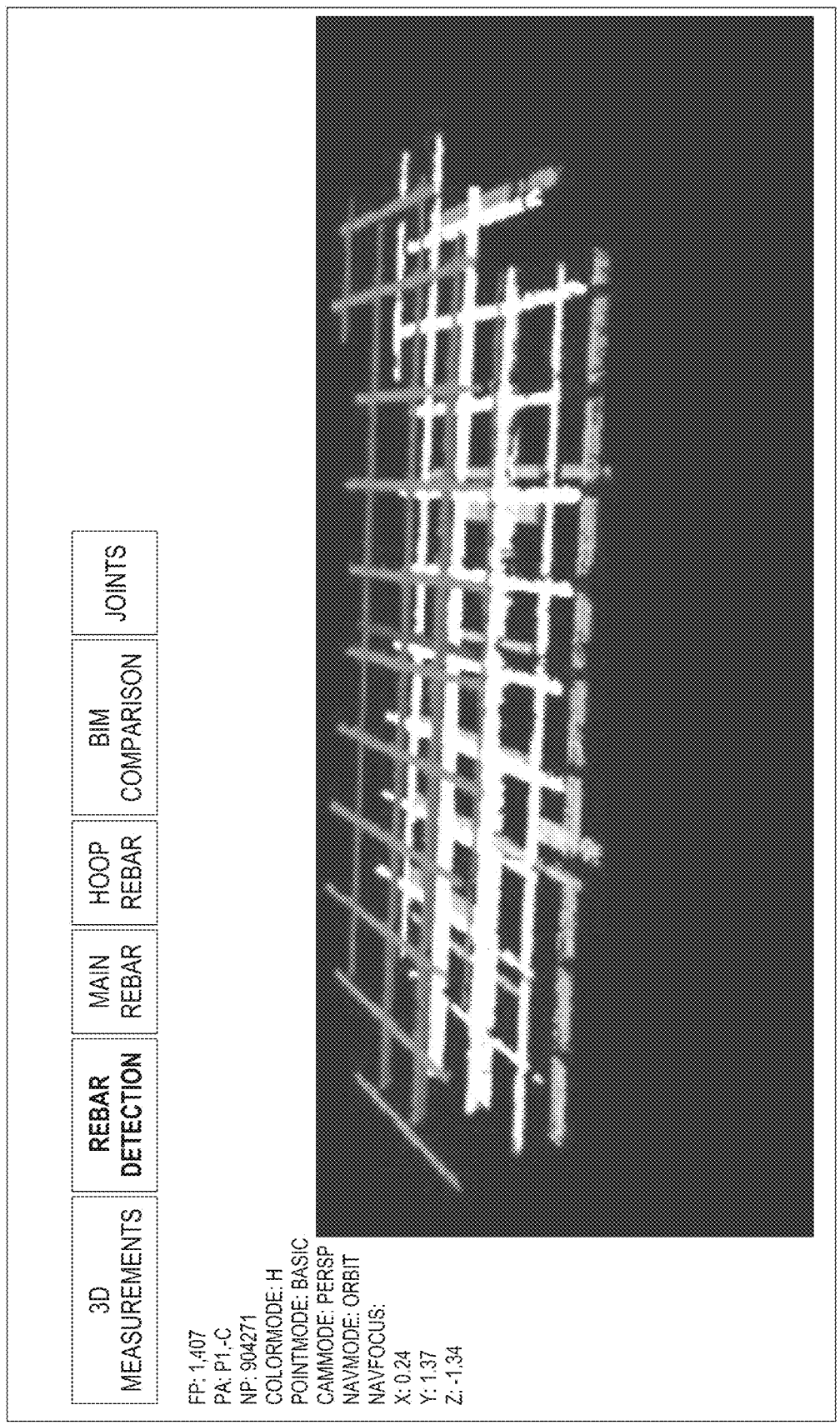
Figure 14C:
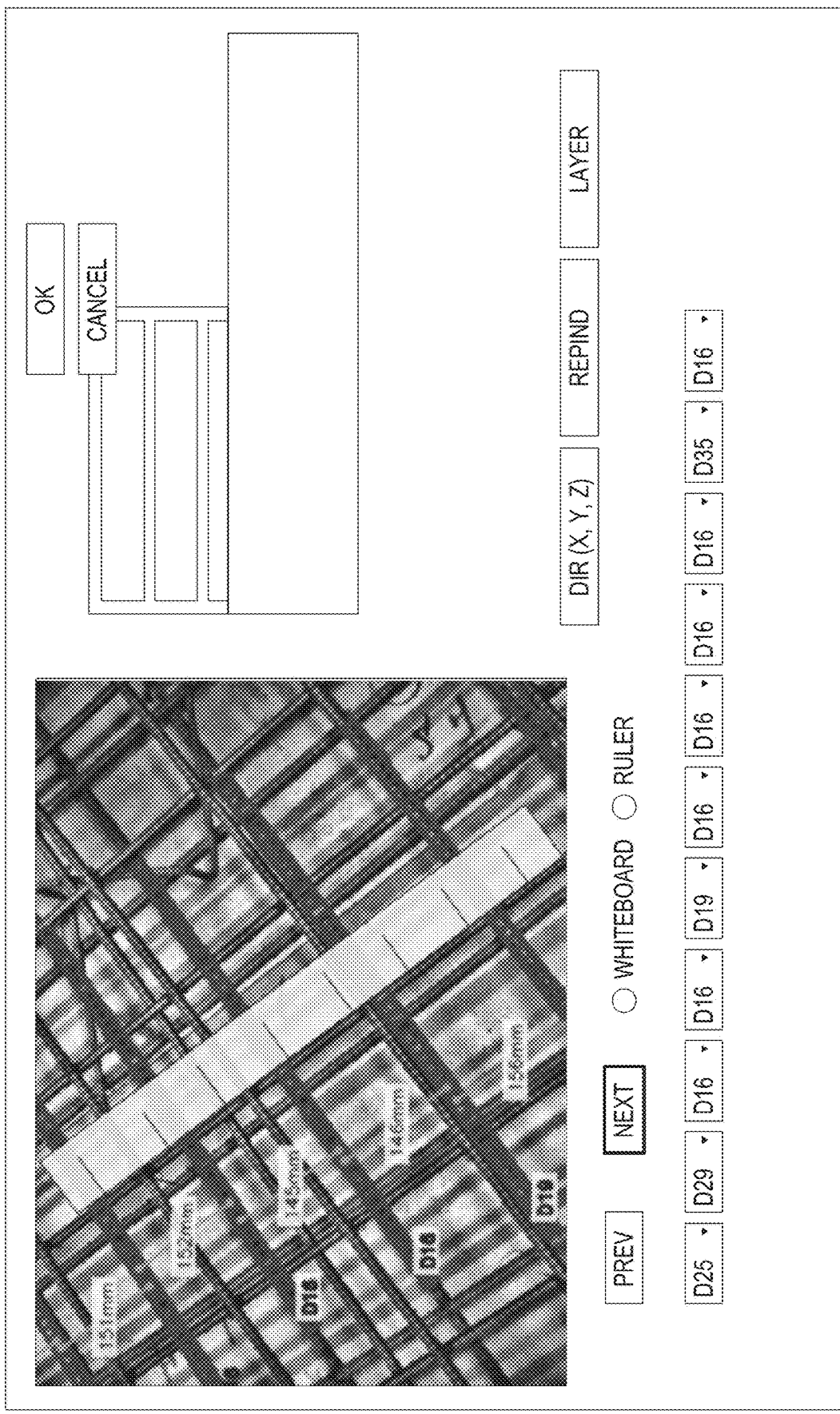

For example, as shown in FIG. 14B, if the user selects the "Rebar Detection" object on the user interface 180, the CARMIS 100 will begin detecting rebar from the images and data acquired from the data acquisition unit 102. Furthermore, as shown in FIG. 14C, information about the rebar detected is displayed and can be edited, annotated, measured detection system 160, BIM 170, user interface 180 including user interface control system 182 and data visualization system 184.

In some embodiments, the body worn sensor package 210 may comprise a Central Processing Unit (CPU) 202, support systems 204, display 206, memory 208, geolocation tracking system 212, BIM 170, user interface 180 including user interface control system 182 and data visualization system 184.

In some embodiments, a handshaking process is performed between elements of the hand-held sensor package 200 and the body worn sensor package 210 to align information between the two systems. Specifically, in some embodiments, the body worn sensor package 210 including helmet mounted cameras, sensors, and AR display may handshake with the hand-held sensor package 200 including a tablet to align a pose captured by the hand-held sensor package 200 with the pose captured by the body worn sensor package 210. For example, the pose captured by the body worn sensor package 210 or hand-held sensor package 200 may be a six (6) degrees of freedom (6DOF) pose. This is achieved by sending a number of salient features (image feature descriptors and the corresponding 3D points) from the body worn sensor package 210 to the hand-held sensor package 200. The hand-held sensor package 200 performs a 3D-2D matching based on the features received (and the matched image features in the tablet image to compute the 6DOF pose transformation (rotation and translation) between the tablet camera and the helmet camera. This transformation is then used to align the pose of the second sensor package with the pose of the first sensor package. This handshake procedure is initiated by the user (e.g., by pressing a button on the tablet or associated with the first sensor package) before recording a sequence for local inspection, to ensure that the second sensor poses are aligned to the global reference frame.

The CPU 202 may comprise one or more commercially available microprocessors, microcontrollers, FPGA, etc. that facilitate data processing and storage. The various support systems 204 facilitate the operation of the CPU 202 and include one or more clock circuits, power supplies, cache, input/output devices and circuits, and the like. In some embodiments, the support systems 204 include the data acquisition cameras and sensors to produce rebar measurements 104 and rebar images/videos 106 such as described herein with respect to FIG. 3. The input/output devices of support systems 204 may further include audio input and output (e.g., commands or instructions for repairs where discrepancies are found). The memory 208 comprises at least one of Read Only Memory (ROM), Random Access Memory (RAM), disk drive storage, optical storage, removable storage and/or the like.

Figure 15:
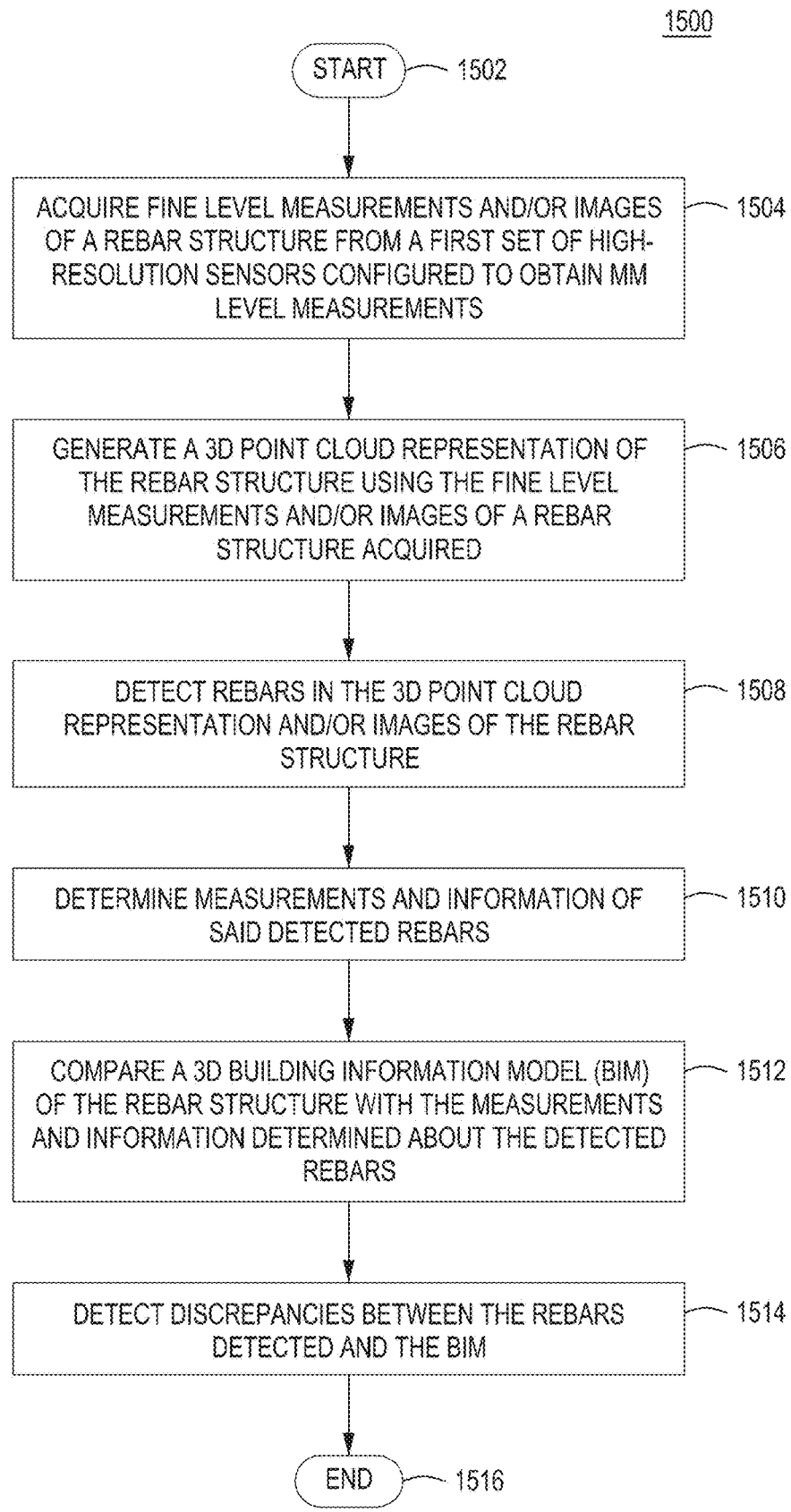
FIG. 15 depicts a flow diagram of at least one embodiment of a computer aided rebar measurement and inspection method for inspection, error analysis and comparison of rebar structures in accordance with a general embodiment of the present principles.

FIG. 15 depicts a flow diagram of a computer aided rebar measurement and inspection method 1500 for inspection, error analysis and comparison of rebar structures in accordance with a general embodiment of the present principles. The method 1500 starts at 1502 and proceeds to 1504 where fine level measurements and/or images of a rebar structure are acquired from a first set of high-resolution sensors configured to obtain mm level measurements. As noted above, about a 0.1 mm to about a 10 mm level precision, or in some embodiments, about a 1 mm to about a 5 mm level precision, of measurements are obtained. At 1506, a 3D point cloud representation of the rebar structure is generated using the fine level measurements and/or images of a rebar structure acquired. The method proceeds to 1508 where rebars in the 3D point cloud representation and/or images of the rebar structure are detected. At 1510, measurements and information of said detected rebars are determined. At 1512, a 3D building information model (BIM) of the rebar structure are compared with the measurements and information determined about the detected rebars. The method proceeds to 1514 where discrepancies are detected between the rebar and the BIM. In some embodiments, detecting the discrepancies further includes generating a compliance report including the discrepancies determined. The method ends at 1516.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 16:
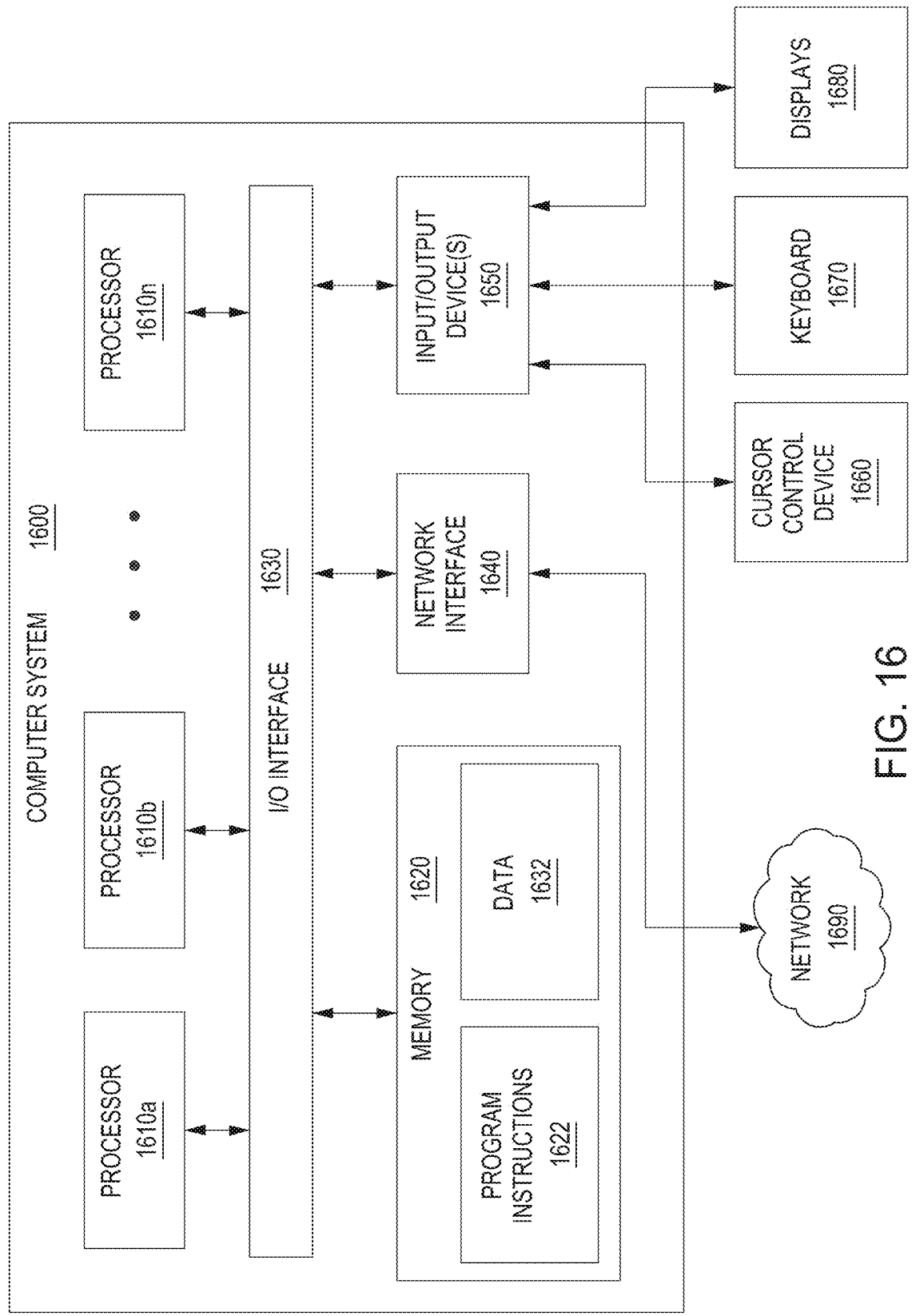
FIG. 16 is a depiction of a computer system that can be utilized in accordance with at least one embodiment of the present principles.

FIG. 16 depicts a computer system 1600 that can be utilized in various embodiments of the present invention to implement the computer and/or the display, according to one or more embodiments.

Various embodiments of computer aided rebar measurement and inspection, as described herein, may be executed on one or more computer systems, which may interact with various other devices. One such computer system is computer system 1600 illustrated by FIG. 16, which may in various embodiments implement any of the elements or functionality illustrated in FIGS. 1-15. In various embodiments, computer system 1600 may be configured to implement methods described above. The computer system 1600 may be used to implement any other system, device, element, functionality or method of the above-described embodiments. In the illustrated embodiments, computer system 1600 may be configured to implement the method 1500 as processor-executable executable program instructions 1622 (e.g., program instructions executable by processor(s) 1610) in various embodiments.

In the illustrated embodiment, computer system 1600 includes one or more processors 1610a-1610n coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In various embodiments, any of the components may be utilized by the system to receive user input described above. In various embodiments, a user interface may be generated and displayed on display 1680. In some cases, it is contemplated that embodiments may be implemented using a single instance of computer system 1600, while in other embodiments multiple such systems, or multiple nodes making up computer system 1600, may be configured to host different portions or instances of various embodiments. For example, in one embodiment some elements may be implemented via one or more nodes of computer system 1600 that are distinct from those nodes implementing other elements. In another example, multiple nodes may implement computer system 1600 in a distributed manner.

In different embodiments, computer system 1600 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs). In multiprocessor systems, each of processors 1610 may commonly, but not necessarily, implement the same ISA.

System memory 1620 may be configured to store program instructions 1622 and/or data 1632 accessible by processor 1610. In various embodiments, system memory 1620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1620. In other embodiments, program instructions and/or data may be received, sent or stored upon different types of computer-accessible media or on similar media separate from system memory 1620 or computer system 1600.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network (e.g., network 1690), such as one or more external systems or between nodes of computer system 1600. In various embodiments, network 1690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

In some embodiments, the illustrated computer system may implement any of the operations and methods described above, such as the methods illustrated by the flowcharts of FIG. 15. In other embodiments, different elements and data may be included.

Those skilled in the art will appreciate that computer system 1600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

The invention claimed is:

1. A computer aided rebar measurement and inspection system, comprising:
    a data acquisition system configured to obtain fine-level rebar measurements of a rebar structure and rebar images or videos of the rebar structures, wherein fine-level rebar measurements are measurements between about a 0.1 mm to about a 10 mm level precision;
    a 3D point cloud model generation system configured to generate a 3D point cloud model representation of a rebar structure from the rebar measurements and rebar images/videos acquired by the data acquisition system;
    a rebar detection system configured to detect rebar both within the 3D point cloud model generated and the rebar images or videos of the rebar structures acquired by the data acquisition system;
    a rebar measurement system configured to automatically measure features of the rebar and rebar structures detected by the rebar detection system based on the fine-level rebar measurements and the rebar images or videos of the rebar structures obtained; and
    a discrepancy detection system configured to compare the measured features of the rebar structures detected by the rebar detection system with a 3D Building Information Model (BIM) of the rebar structures, and determine any discrepancies between them,
    wherein the rebar detection system and the rebar measurement system are configured to use deep machine learning techniques to refine the detection of rebar and measurement of features of the rebar and rebar structures detected by the rebar detection system.

2. The computer aided rebar measurement and inspection system of claim 1, further comprising:
    a rebar joint detection system configured to detect rebar joints of two rebars together, wherein the rebar joints of two rebars together include at least one of welded rebar joints or mechanically coupled rebar joints.

3. The computer aided rebar measurement and inspection system of claim 2, wherein the rebar joint detection system is configured to detect welded rebar joints by:
    locating all intersections of a rebar with other rebars;
    sectioning a remaining portion of the rebar other than the located intersections with a plane and computing an envelope of all measured points from the 3D point cloud; and
    identifying portions of the rebar where a thickness of a 3D point cloud representation of the rebar increases.

4. The computer aided rebar measurement and inspection system of claim 1, wherein the data acquisition system includes a first set of sensors that includes a computing device including an image and 3D sensor, wherein the first set of sensors is configured to capture 3D data by scanning the rebar structure with the computing device.

5. The computer aided rebar measurement and inspection system of claim 4, wherein the 3D data is processed using dense stereo point cloud integration modules and bundle adjustment modules to compute integrated 3D points of a scanned area of the rebar structure.

6. The computer aided rebar measurement and inspection system of claim 1, further comprising:
    a user interface configured to provide a user controls and data visualization features to interact with the computer aided rebar measurement and inspection system, wherein the user interface displays the discrepancies between the features of the rebar structures detected by the rebar detection system with the BIM, and wherein the user interface includes selectable objects configured to, and responsive to a user section of, at least one of initiate generation of the 3D point cloud model, initiate rebar detection, initiate refining of axis and diameter estimates for rebar hypotheses along one direction, initiate alignment of the 3D point cloud model to the BIM for an inspected rebar structure and comparison detection results with the BIM, or initiate detection of welded joints for rebar in a given direction.

7. A computer aided rebar measurement and inspection method comprising:
    acquiring, by a data acquisition systems, fine level measurements and images of a rebar structure from a first set of sensors configured to obtain mm level measurements, wherein fine-level rebar measurements are measurements between about a 0.1 mm to about a 10 mm level precision;
    generating a 3D point cloud representation of the rebar structure using the fine level measurements and images of a rebar structure acquired;

detecting rebars in the 3D point cloud representation and/or images of the rebar structure using deep machine learning techniques to refine the detection of rebar;

determining measurements and information of said detected rebars based on the fine-level rebar measurements and the rebar images or videos of the rebar structures obtained using deep machine learning techniques to refine measurement of features of the rebar and rebar structures detected;

comparing a 3D building information model (BIM) of the rebar structure with the measurements and information determined about the detected rebars; and detecting discrepancies between the rebars detected and the BIM.

8. The computer aided rebar measurement and inspection method of claim 7, wherein detecting discrepancies between the rebars detected and the BIM includes:

aligning the 3D point cloud representation of the rebar structure to the BIM of the rebar structure; and comparing the 3D point cloud representation of the rebar structure to the BIM of the rebar structure to detect discrepancies between them.

9. The computer aided rebar measurement and inspection method of claim 7, further comprising:

generating a report including discrepancies determined between the measurements and information obtained about the rebar structure from the first set of sensors and the BIM of the rebar structure.

10. The computer aided rebar measurement and inspection method of claim 7, wherein the data acquisition system includes a first set of sensors that includes a computing device including an image and 3D sensor, wherein the first set of sensors is configured to capture 3D data by scanning the rebar structure with the computing device.

11. The computer aided rebar measurement and inspection method of claim 10, wherein the 3D data is processed using at least one of dense stereo point cloud integration modules or bundle adjustment modules to compute integrated 3D points of a scanned area of the rebar structure.

12. The computer aided rebar measurement and inspection method of claim 7, wherein detecting rebars in the 3D point cloud representation of the rebar structure includes pruning the 3D point cloud representation to remove outliers data points to produce a refined 3D point cloud representation of the rebar structure after detection.

13. The computer aided rebar measurement and inspection method of claim 12, wherein the refined 3D point cloud representation of the rebar structure is transformed into at least one 2D histogram representation of the rebar structure to facilitate detection of the rebars.

14. The computer aided rebar measurement and inspection method of claim 13, wherein peaks in the histogram correspond to rebars that are perpendicular to a plane where the histogram is accumulated, wherein diameters of the rebars are estimated from a size of the peak areas, and wherein a precision of the diameters of the rebars are refined using edge detection information determined from the images of the rebar structure.

15. The computer aided rebar measurement and inspection method of claim 7, wherein detecting rebars in the images of the rebar structure includes:

detecting sets of parallel rebars having a similar diameter, the sets of parallel rebars forming a plane and regularly spaced apart from each other, wherein the sets of parallel rebars are detected using non-maximum suppression and/or other heuristics.

16. The computer aided rebar measurement and inspection method of claim 7, wherein detecting rebars in the images of the rebar structure includes:

creating an annotated dataset using edge detection techniques to identify locations of edges of rebars to within about a 1 mm to about a 5 mm precision, and store said locations within the annotated dataset.

17. The computer aided rebar measurement and inspection method of claim 16, wherein information associated with the rebars stored in the annotated dataset is used to create an occlusion mask to train models for edge detection, or to train an appearance detector for detecting rebar texture.

18. The computer aided rebar measurement and inspection method of claim 17, using the trained models or appearance detector to detect other sets of rebars.

19. The computer aided rebar measurement and inspection method of claim 7, wherein detecting rebars in the images of the rebar structure includes detecting texture appearance of rebars of different types and depths using at least one of:

(1) Gabor wavelets to detect localized pixel wavelength/frequency which is dependent upon rebar type and distance to a camera acquiring the image of the rebar; or (2) rebar texture pattern matching between two or more rebars for rebars of similar orientation and type.

20. The computer aided rebar measurement and inspection method of claim 7, wherein detecting rebars in the images of the rebar structure includes:

determining direction and orientation of rebars using vanishing points techniques; and determining additional proximate rebars having similar direction and orientation.

21. The computer aided rebar measurement and inspection system of claim 1, wherein the deep machine learning techniques include the use an occlusion mask to train models for edge detection, or to train an appearance detector for detecting rebar texture.

22. A computer aided rebar measurement and inspection system, comprising:

a data acquisition system configured to obtain fine-level rebar measurements of a rebar structure and rebar images or videos of the rebar structures, wherein fine-level rebar measurements are measurements between about a 0.1 mm to about a 10 mm level precision;

a 3D point cloud model generation system configured to generate a 3D point cloud model representation of a rebar structure from the rebar measurements and rebar images/videos acquired by the data acquisition system;

a rebar detection system configured to detect rebar both the 3D point cloud model generated and the rebar images or videos of the rebar structures acquired by the data acquisition system;

a rebar measurement system configured to automatically measure features of the rebar and rebar structures detected by the rebar detection system based on the fine-level rebar measurements and the rebar images or videos of the rebar structures obtained;

an appearance detector configured to be trained for rebar texture detection using model training techniques that include at least one of histograms of oriented gradients (HOG), Support Vector Machines (SVM), conditional random field (CRF), pix2pix, or convolutional neural networks (CNNs); and a discrepancy detection system configured to compare the measured features of the rebar structures detected by the rebar detection system with a 3D Building Information Model (BIM) of the rebar structures, and determine any discrepancies between them.

23. The computer aided rebar measurement and inspection system of claim 22, wherein the appearance detector is configured to recover a 3D geometry of the BIM and physical deviations from BIM are analyzed to determine the rebar texture.

* * * * *